(12) United States Patent
Oya et al.

(10) Patent No.: US 7,305,155 B2
(45) Date of Patent: Dec. 4, 2007

(54) OPTICAL ELEMENT AND WAVELENGTH SEPARATOR USING THE SAME

(75) Inventors: Kazuaki Oya, Ikeda (JP); Tatsuhiro Nakazawa, Minato-ku (JP); Shigeo Kittaka, Minato-ku (JP); Keiji Tsunetomo, Minato-ku (JP); Junji Nishii, Ikeda (JP)

(73) Assignees: Nippon Sheet Glass Company, Limited, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 48 days.

(21) Appl. No.: 11/089,434

(22) Filed: Mar. 24, 2005

(65) Prior Publication Data

US 2005/0271322 A1 Dec. 8, 2005

(30) Foreign Application Priority Data

Mar. 26, 2004 (JP) ............................. 2004-093065

(51) Int. Cl.
*G02B 6/12* (2006.01)
(52) U.S. Cl. .......................................... 385/14; 385/37
(58) Field of Classification Search .................... None
See application file for complete search history.

(56) References Cited

U.S. PATENT DOCUMENTS 4,740,951 A * 4/1988 Lizet et al. .................... 398/87
4,786,133 A * 11/1988 Gidon et al. ................... 385/37
6,134,043 A * 10/2000 Johnson et al. ............. 359/237
7,076,143 B2 * 7/2006 Takahashi .................... 385/129
2002/0027655 A1 3/2002 Kittaka et al.
2003/0147233 A1 * 8/2003 Sugiura et al. ................ 362/31

FOREIGN PATENT DOCUMENTS

| JP | 2002-236206 | 8/2002 |
|---|---|---|
| JP | 2004-157421 | 6/2004 |

OTHER PUBLICATIONS

Joannopoulos, et al., "Photonic Crystals", Princeton University Press, 1995, month unknown.
Plihal, et al., "Phtonic band structure of two-dimensional systems: The triangular lattice", Physical Review, vol. B44, No. 16, Oct. 1991, p. 8565-8571.

* cited by examiner

*Primary Examiner*—Rodney Bovernick
*Assistant Examiner*—Mike Stahl
(74) *Attorney, Agent, or Firm*—Hamre, Schumann, Mueller & Larson, P.C.

(57) ABSTRACT

A wavelength separator includes a one-dimensional photonic crystal structure formed by providing a plurality of grooves in parallel with one another at uniform intervals in a homogeneous medium, and has an incident end face formed obliquely with respect to a direction in which the grooves extend, and an output end face formed approximately perpendicular to the incident end face.

14 Claims, 22 Drawing Sheets

OPTICAL ELEMENT AND WAVELENGTH SEPARATOR USING THE SAME

BACKGROUND OF THE INVENTION

1. Field of the Invention

The present invention relates to an optical element capable of separating light having different wavelengths, for use in optical communication, pickup apparatuses for use with optical disks, etc.

2. Description of Related Art

Due to the rapid spread of the Internet, there is a strong demand for an increase in the information transmission capacity of an optical fiber communication network. Under such a circumstance, wavelength division multiplexing (WDM) has been developed rapidly. The WDM is a communication technique of multiplexing independent information to transmit it, using light having a plurality of different wavelengths. According to this technique, in order to separate a signal that has been multiplexed, a wavelength separator having satisfactory wavelength selectivity is required.

As an element to be used as such a wavelength separator, a photonic crystal has been proposed (see, for example, JP-A-2002-236206). A photonic crystal is an artificially made crystal having a refractive index that is periodic with a period in the same order as the wavelength of light. A photonic crystal is categorized as one-dimensional, two-dimensional, or three-dimensional photonic crystal depending on the direction in which the photonic crystal has the periodicity of the refractive index. The two-dimensional and three-dimensional photonic crystals, which allow a three-dimensional waveguide structure to be provided, therefore have the effect of allowing a plurality of optical elements to be integrated in a limited size. However, two- or three-dimensional photonic structures are difficult to produce, since the structures have complexity.

SUMMARY OF THE INVENTION

The present invention has been made in light of the foregoing problems, and it is an object of the present invention to provide an optical element that is easy to manufacture, is small in size, and has high wavelength resolution, as well as to provide a wavelength separator in which the optical element is used.

To solve the foregoing problems, an optical element of the present invention includes a one-dimensional photonic crystal structure formed by providing a plurality of grooves in parallel with one another at uniform intervals in a homogeneous medium, and has an incident end face formed obliquely with respect to a direction in which the grooves extend, and an output end face formed approximately perpendicular to the incident end face.

Further, a wavelength separator of the present invention includes the foregoing optical element of the present invention, a light input section causing a light beam to be incident on the incident end face of the optical element, and a light output section on which light beams outgoing from the output end face of the optical element are incident, the light beams outgoing at different output angles depending on wavelengths thereof, respectively. The light input section causes the light beam incident on the incident end face from the light input section to enter the optical element through the incident end face in a manner such that the light beam is coupled with a photonic band within the second Brillouin zone exclusive of a boundary between the first and second Brillouin zones.

DETAILED DESCRIPTION OF THE INVENTION

Figure 1:
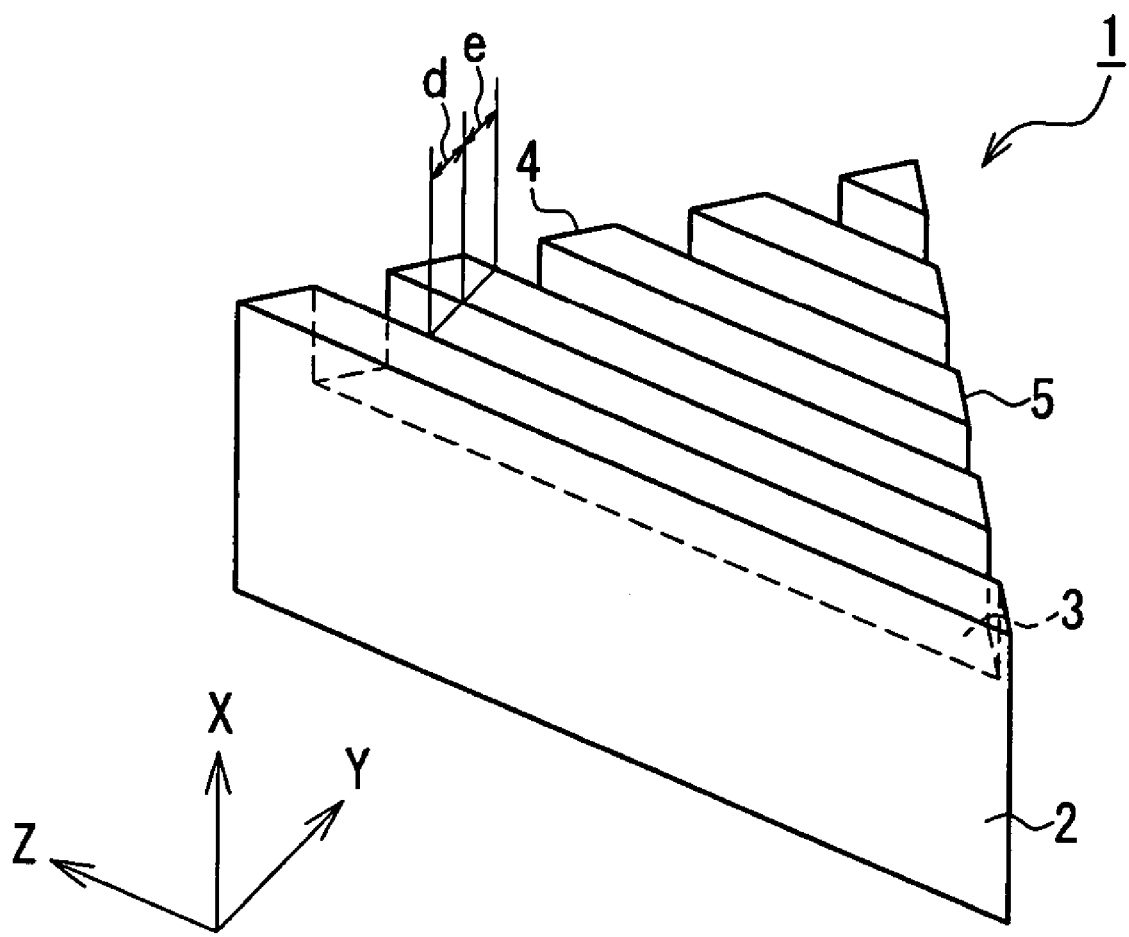
FIG. 1 is a perspective view illustrating a configuration of an optical element according to Embodiment 1 of the present invention.

Since the optical element of the present invention has a one-dimensional photonic crystal structure formed by forming grooves in a homogeneous medium, a step of stacking films is unnecessary, and therefore, the optical element can be produced easily within a short time. Further, the optical element has high wavelength resolution.

Further, preferably the grooves are filled with a filler material having a refractive index different from a refractive index of the homogeneous medium. This configuration allows propagation characteristics to vary widely, thereby widening the range of design.

Still further, since the wavelength separator of the present invention utilizes the coupling of light with a photonic band within the second Brillouin zone exclusive of a boundary between the first and second Brillouin zones, high wavelength resolution can be provided.

Still further, preferably, the light input section causes the light beam incident on the incident end face from the light input section to enter the optical element through the incident end face at an incident angle such that the light beam is coupled with the photonic band within the second Brillouin zone exclusive of a boundary between the first and second Brillouin zones. This configuration allows the coupling of light with a photonic band within the second Brillouin zone exclusive of a boundary between the first and second Brillouin zones to be utilized, whereby high wavelength resolution is provided.

Still further, preferably, the light input section includes an input-side optical waveguide part through which incident light propagates, and a collimating section for converting the incident light having propagated through the input-side optical waveguide part into an approximately parallel light beam and causing the approximately parallel light beam to be incident on the optical element, and the light output section includes a plurality of output-side optical waveguide parts on which a plurality of outgoing light beams outgoing from the optical element are incident, respectively, the outgoing light beams outgoing at different output angles depending on wavelengths, respectively, and a focusing part for focusing the plurality of outgoing light beams so that the plurality of outgoing light beams are incident on the plurality of output-side optical waveguide parts, respectively. With this configuration, the wavelength separator is capable of separating a light beam including a plurality of light beams having different wavelengths, according to the wavelengths.

Still further, preferably, the wavelength separator further includes two claddings disposed so that the homogeneous medium is provided between the claddings so as to be a core of the claddings, in which the input-side optical waveguide part is an input-side optical waveguide provided in the homogeneous medium, the collimating part is an input-side concave mirror provided in the homogeneous medium, the focusing part is an output-side concave mirror provided in the homogeneous medium, and the output-side optical waveguide part is an output-side optical waveguide provided in the homogeneous medium. This configuration allows the wavelength separator to have a waveguide structure, whereby the wavelength separator can be used as an optical integrated circuit.

Still further, preferably, the input-side optical waveguide and the output-side optical waveguide are formed by filling the grooves provided in the homogeneous medium with a filler material having a refractive index higher than a refractive index of the homogeneous medium. This configuration makes the input-side optical waveguide and the output-side optical waveguide easy to manufacture, and provides high manufacturing accuracy.

Still further, preferably, the input-side concave mirror and the output-side concave mirror are formed by forming curved grooves in the homogeneous medium, whereby the input-side concave mirror and the output-side concave mirror are formed at interfaces between the homogeneous medium and the curved grooves. This configuration makes the input-side concave mirror and the output-side concave mirror easy to manufacture, and provides high manufacturing accuracy.

Still further, preferably, the wavelength separator further includes two claddings disposed so that the homogeneous medium is provided between the claddings so as to be a core of the claddings, and the light input section and the light output section are formed in the homogeneous medium. This makes it possible to provide a wavelength separator with high resolution, which is capable of separating a light beam including a plurality of light beams having different wavelengths, according to the wavelengths.

Still further, preferably, a plurality of grooves are formed in the claddings, the plurality of grooves being connected with the plurality of parallel grooves provided in the homogeneous medium, respectively. This reduces the effective refractive indices of the claddings, thereby reducing the leakage of light from the optical element.

Still further, preferably, the grooves are filled with a filler material having a refractive index different from a refractive index of the homogeneous medium. This allows the effective refractive index of the optical element to increase, thereby reducing the leakage of light from the optical element.

Still further, preferably, multilayered films having a refractive index periodicity in a direction perpendicular to the homogeneous medium are formed between one of the two claddings and the homogeneous medium and between the other cladding and the homogeneous medium, respectively. This configuration allows the claddings to have band gaps, thereby allowing light to be confined completely. Therefore, this prevents the leakage of light from the optical element.

Still further, preferably, a multilayered film having a refractive index periodicity in a direction perpendicular to the homogeneous medium is formed between one of the two claddings and the homogeneous medium, and the other one of the two claddings is not in contact with the optical element. This configuration allows the foregoing one of the claddings to have a band gap, thereby allowing light to be confined completely, while this configuration also makes air having a low refractive index serve as the other cladding. Accordingly, the leakage of light from the optical element is reduced.

Still further, preferably, the wavelength separator further includes a waveguide-use homogeneous medium that has a refractive index lower than a refractive index of the homogeneous medium and that is disposed at least in contact with the incident end face and the output end face, and two claddings disposed so that the homogeneous medium and the waveguide-use homogeneous medium are provided between the claddings so as to be a core of the claddings. In the foregoing wavelength separator, the light input section and the light output section are formed in the waveguide-use homogeneous medium. This configuration allows the optical element to be formed with a material having a further higher refractive index. Accordingly, the leakage of light from the optical element is reduced.

Hereinafter, further specific examples of embodiments of the present invention will be described with reference to the drawings.

EMBODIMENT 1

The following describes an optical element according to Embodiment 1 of the present invention. FIG. 1 is a perspective view illustrating a configuration of an optical element according to Embodiment 1 of the present invention. In FIG. 1, the optical element 1 is configured by forming grooves 3 in a homogeneous medium 2. The grooves 3 are formed in parallel so as to extend in one direction and have uniform widths. Intervals at which the grooves 3 are arranged also are uniform. It should be noted that, as shown in FIG. 1, the direction in which the grooves 3 extend is a Z-axis direction, a direction in which layers of the homogeneous medium 2 and air filling the grooves 3 are stacked is a Y-axis direction, and a direction perpendicular to both the Z axis and the Y axis is an X-axis direction. In other words, the grooves 3 are parallel with an X-Z plane, and are stacked in the Y-axis direction. Thus, the optical element 1 is configured so that air and the homogeneous medium 2 are stacked alternately, thereby being a one-dimensional photonic crystal structure. A period a of the one-dimensional photonic crystal structure is a sum of a width d of the groove 3 in the Y-axis direction and a width e of the homogeneous medium 2 in the Y-axis direction (the interval of the grooves 3) (a=d+e). The period a and the width d (or the width e) preferably satisfy the following relationship:

$$0.2 \leq d/a \leq 0.8 \text{(or } 0.2 \leq e/a \leq 0.8\text{)}$$

Further, the period a desirably is at the same order as a wavelength of light used, or less than that. It should be noted that generally d/a (or e/a) is referred to as the duty ratio.

Further, the optical element 1 has an incident end face 4 on which light (light beam) is incident, and an output end face 5. The incident end face 4 is formed obliquely with respect to the direction in which the grooves 3 extend, that is, the Z-axis direction. The output end face 5 is formed so as to cross the incident end face 4 orthogonally.

Figure 2A:
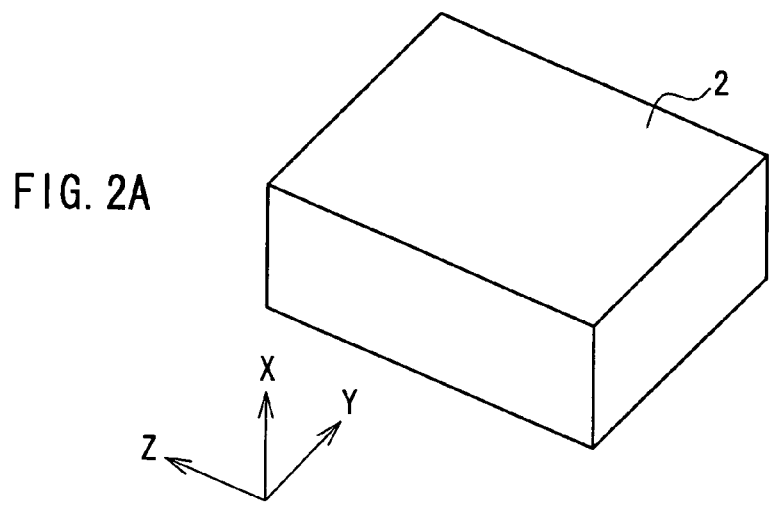
FIG. 2A is a perspective view for explaining a step of a method for producing the optical element according to Embodiment 1 of the present invention.
Figure 2B:
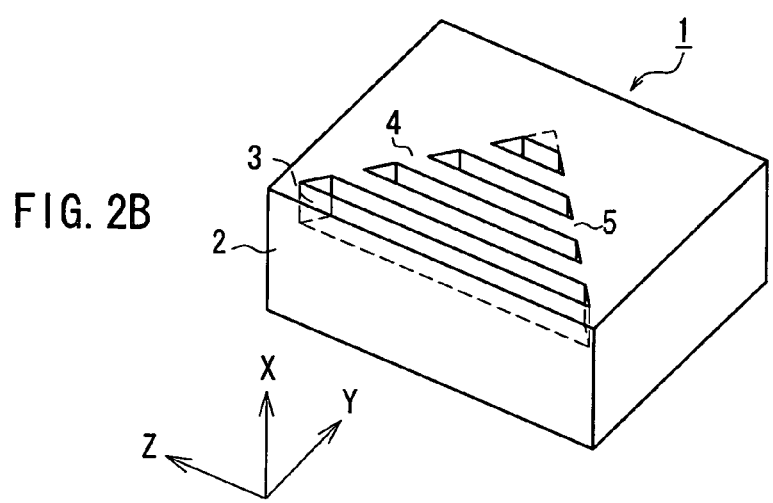
FIG. 2B is a perspective view for explaining a step of the method for producing the optical element according to Embodiment 1 of the present invention.
Figure 2C:
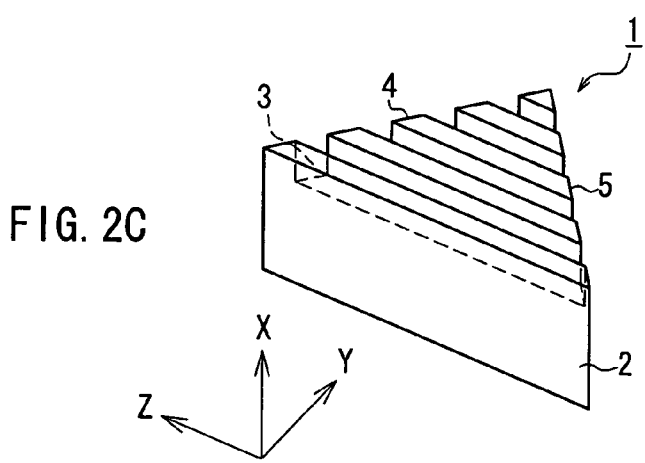
FIG. 2C is a perspective view for explaining a step of the method for producing the optical element according to Embodiment 1 of the present invention.

FIGS. 2A to 2C are perspective views illustrating steps of a method for producing the optical element 1 according to Embodiment 1 of the present invention. First of all, as shown in FIG. 2A, a flat plate-like homogeneous medium 2 is prepared. As the homogeneous medium 2, $SiO_2$, Ge—$SiO_2$, or the like may be used, for instance. Next, as shown in FIG. 2B, the grooves 3 are formed in parallel with one another at regular intervals in the homogeneous medium 2. Upon the formation of the grooves 3, the optical element 1 having the incident end face 4 and the output end face 5 is formed in the homogeneous medium 2. The incident end face 4 and the output end face 5 are inclined obliquely with respect to the grooves 3, respectively, and they are orthogonal to each other. Further, as shown in FIG. 2C, portions of the homogenous medium 2 are removed therefrom so that the incident end face 4 and the output end face 5 are exposed, whereby the optical element 1 shown in FIG. 1 is formed.

To form the grooves 3, patterning by photolithography and groove machining by vapor etching may be carried out. More specifically, the homogeneous medium 2 is coated with a photoresist by spin coating, and thereafter, a resist pattern with a desired period is formed by exposure. Examples of the exposure include mask exposure utilizing ultraviolet radiation such as exposure utilizing a g-rays or i-rays lamp, direct drawing or mask exposure utilizing ultraviolet laser such as He—Cd laser, two-beam interference exposure, and direct drawing utilizing an electron beam. Any one regarded as suitable with the cost and the period width of the resist pattern taken into consideration may be selected and used from the foregoing examples.

Next, a metal film is formed on the resist pattern. Sputtering or vapor deposition, for example, may be used for the film formation, and chromium or nickel, for instance, may be used for forming the metal film. It should be noted that in the case where the lift-off method is applied after this step, the vapor deposition desirably is used with a view to preventing damage to the photoresist and enhancing the patterning accuracy.

Further, unnecessary portions of the metal film are removed therefrom by the lift-off method along with the resist pattern, whereby a metal mask pattern is formed.

Next, vertical deep groove machining with use of an ion etching machine is performed, whereby the grooves 3 are formed. It should be noted that in ion etching, in order to treat a large area efficiently, it is desirable to use a reactive ion etching method using high-density plasma, such as inductively coupled plasma (ICP), magnetic neutral loop discharge plasma (NLD), or the like.

Further, remaining portions of the metal mask are removed by using an etchant or the like. Thus, the grooves 3 can be formed with a desired arrangement and shape in the homogeneous medium 2 through the above-described process, for instance.

It should be noted that the optical element 1 configured as shown in FIG. 2B also can be used. In the case of this configuration, incident light and outgoing light do not arrive through air and outgo into air, respectively, but they arrive through the homogeneous medium 2 and outgo into the homogeneous medium 2, respectively. Besides, since the production cost can be reduced further in the case where the optical element configured as shown in FIG. 2B is used, actually the optical element is used often in this configuration.

The grooves 3 may be formed by V-groove machining. Here, the width d of the groove 3 may be set so as to satisfy $0.2 \leq d/a \leq 0.8$ as described above. It should be noted that here the optical element 1 is in an approximately trigonal prism shape, but it may be in any other shape as long as it has an incident end face 4 and an output end face 5 that cross each other orthogonally. Thus, the optical element according to Embodiment 1 is produced by forming the grooves 3 in the homogeneous medium 2 so that a periodic structure as a one-dimensional photonic crystal is formed. Therefore it can be produced easily within a short time. For producing a periodic structure that is a one-dimensional photonic crystal, other methods are applicable such as a method of depositing films by vapor deposition, sputtering, ion-assisted vapor deposition, or CVD, but such a method has a problem that the formation of films takes time.

The configuration may be such that an angle formed between the incident end face 4 and the grooves 3 and an angle formed between the output end face 5 and the grooves 3 are substantially equal to each other. This configuration of the optical element 1 is simpler, and hence, it can be produced easily.

The optical element 1 formed by the method according to Embodiment 1 has a multilayered periodic structure composed of air and the homogeneous medium 2, but it may be modified by filling the grooves 3 with a medium (filler material) such as a gas or a liquid having a refractive index different from that of the homogeneous medium 2, whereby the optical element 1 is made a multilayered periodic structure composed of the foregoing medium and the homogeneous medium 2. The modification allows the difference between refractive indices of the layers to vary, thereby allowing a variety of propagation properties to be provided, which increases the flexibility in designing.

The following describes a method of separating a plurality of light beams having different wavelengths according to their wavelengths, using the optical element 1 of Embodiment 1.

Figure 3:
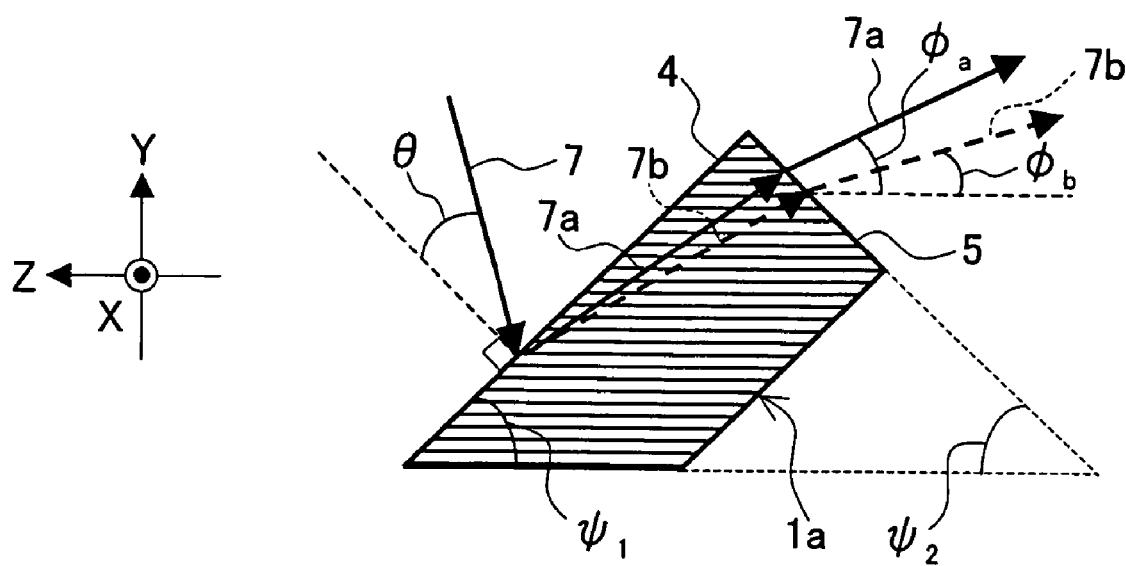
FIG. 3 is a plan view for explaining a method for performing wavelength branching with use of the optical element according to Embodiment 1 of the present invention.

FIG. 3 is a plan view for explaining a method for wavelength branching by using the optical element according to Embodiment 1 of the present invention. The optical element 1a shown in FIG. 3, having a one-dimensional photonic crystal structure, is not triangular on the Y-Z plane like the optical element 1 of FIG. 1, but is in a shape of a part of a triangle. This optical element 1a however has a function similar to that of the optical element 1 of FIG. 1. In the optical element 1 of FIG. 1, a beam of light outgoing from the output end face 5 has a diameter smaller than that of a beam of light entering the optical element 1 through the incident end face 4. Therefore, actually the output end face 5 is allowed to have an area smaller than the incident end face 4. Therefore, the optical element 1a shown in FIG. 3 is configured by modifying the optical element 1 of FIG. 1 so that the output end face 5 is formed only over a necessary range. Since this configuration allows size reduction of the optical element, it is preferable to use an optical element in a shape like that of the optical element 1a actually. In other words, the optical element may be formed in any shape as long as it does not cause problems in the propagation and outgoing of light, and the shape along the Y-Z plane is not limited to the triangular shape.

A light beam 7 is incident on the incident end face 4 of the optical element 1a at an incident angle θ. It should be noted that the incident angle θ is an angle formed between a normal line of the incident end face 4 and the light beam 7. The light beam 7 includes two light beams 7a and 7b having different wavelengths. When propagating through the optical element 1, the light beams 7a and 7b propagate in different propagation directions. Further, when outgoing from the output end face 5, the light beams 7a and 7b outgo at different output angles $\phi_a$ and $\phi_b$, respectively. It should be noted that the output angle $\phi_a$ (or $\phi_b$) is an angle formed between the Z axis and the outgoing light beam 7a (or 7b). Further, in the optical element 1a, an angle formed between the incident end face 4 and the Z axis is $\psi_1$, while an angle formed between the output end face 5 and the Z axis, i.e., the angle $\psi_2$, is $(90°-\psi_1)$.

Thus, since the outgoing light beams outgo at different angles according to wavelengths thereof, the optical element 1a can be used as a wavelength separator. A condition for this is as follows: in the propagation through the optical element 1a, a band within a second Brillouin zone from which vicinities of a boundary between a first Brillouin zone and the second Brillouin zone are excluded should be used. By so doing, a phenomenon occurs in which a difference between outgoing angles of light beams having different wavelengths is increased. In other words, great wavelength dispersion can be achieved.

Figure 4:
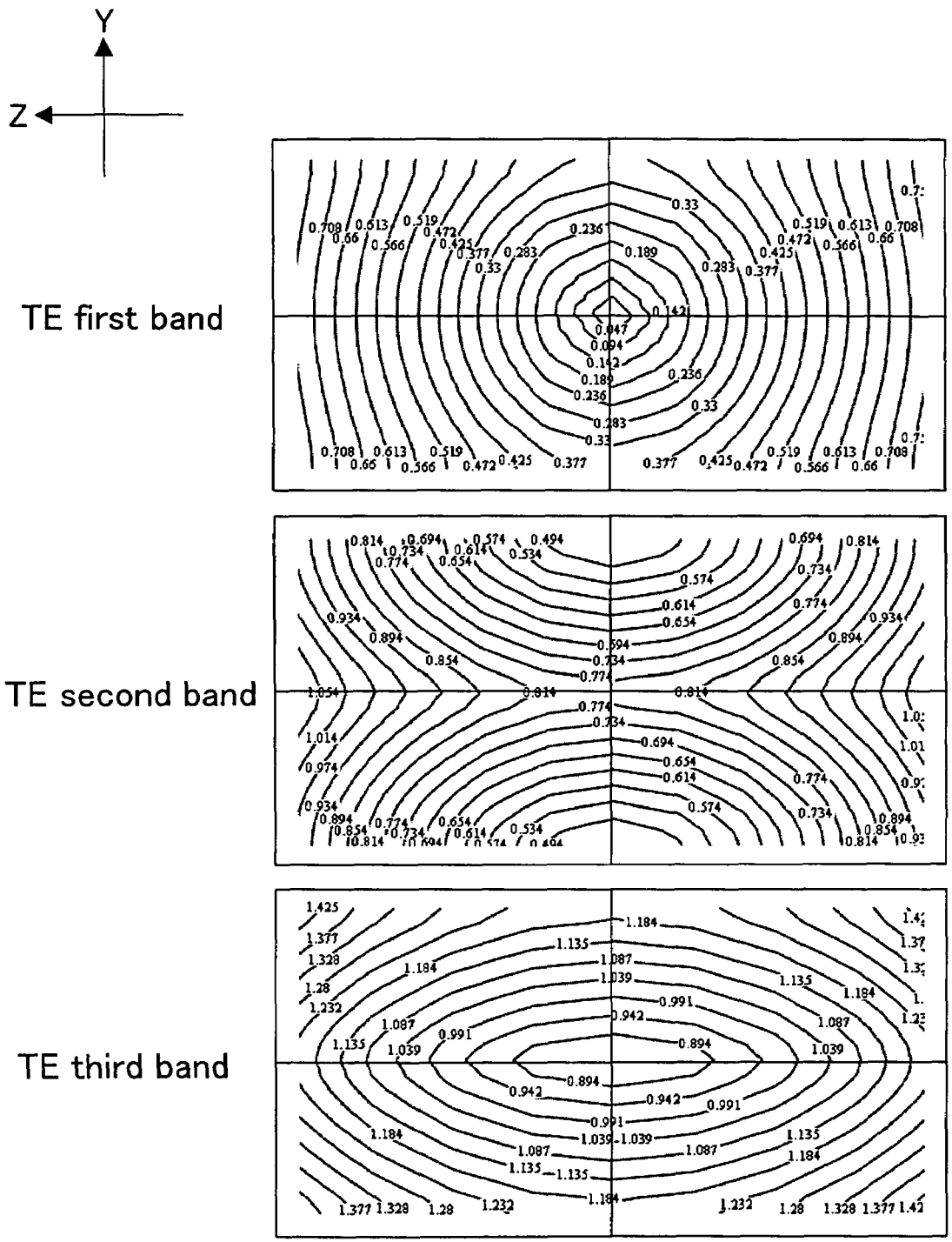
FIG. 4 is a band diagram within the first Brillouin zone of a periodic structure.

The following describes the foregoing phenomenon while referring to FIG. 1. In the optical element 1, it is assumed that the widths d and e are equal to each other, the homogenous medium 2 has a refractive index of 1.45, and the grooves 3 are filled with a substance having a refractive index of 1.00. FIG. 4 shows band diagrams of first, second, and third bands within the range of the first Brillouin zone of TE polarized light in a periodic structure that composes the optical element 1. In the band diagrams, lines like contour lines are shown, each of which links points at which a normalized frequency $\omega a/2\pi c$ takes a certain specific value. The lines like contour lines are hereinafter referred to as contour lines. The normalized frequency $\omega a/2\pi c$ is expressed with an angular frequency $\omega$ of light, a period a of the structure, and light velocity c in vacuum. The period a of the structure is a sum (d+e) of the width d of the groove 3 and the width e of the homogenous medium 2 shown in FIG. 1. Here, the normalized frequency also can be expressed as $a/\lambda_0$, using a wavelength $\lambda_0$ of incident light in vacuum. Hereinafter, the normalized frequency is expressed simply as $a/\lambda_0$.

A range in the Y-axis direction of one certain Brillouin zone is $\pm\pi/a$, whereas the Brillouin zone does not have a boundary but extends infinitely in the transverse direction since it does not have periodicity in the Z-axis direction.

It should be noted that the TE polarized light refers to polarized light that has an electric field directed in the X-axis direction when being incident.

Such band diagrams are derived by band calculation. The band calculation is described in detail in, for instance, "Photonic Crystals", Princeton University Press (1995), and Physical Review B, Vol. 44, No. 16, P.8565, 1991.

Figure 5:
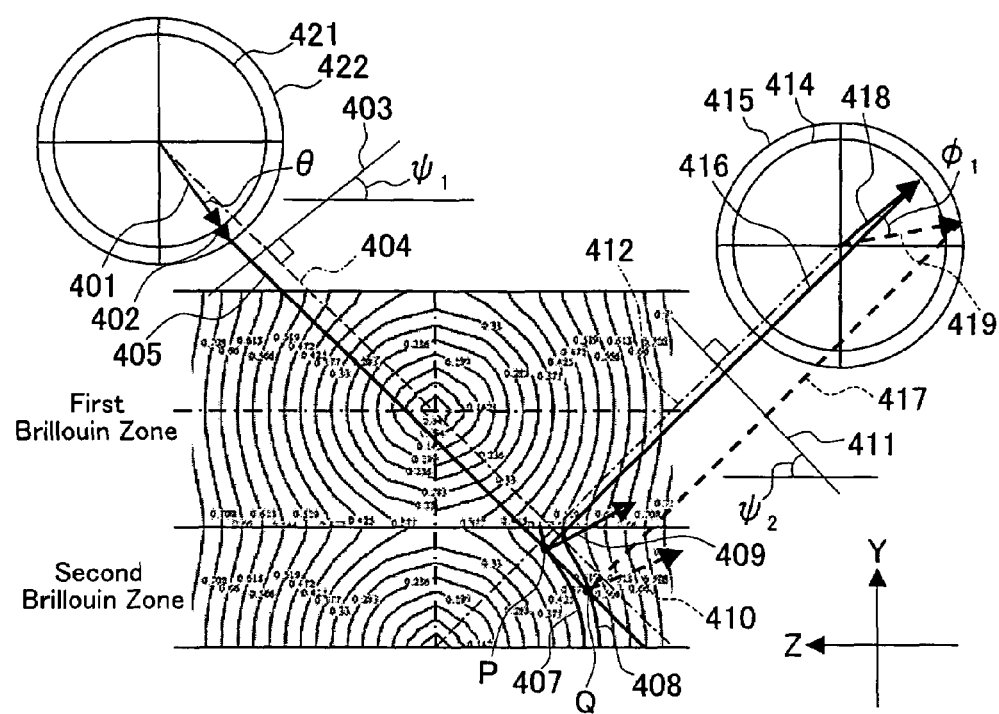
FIG. 5 is a band diagram showing the first and second Brillouin zones.
Figure 6A:
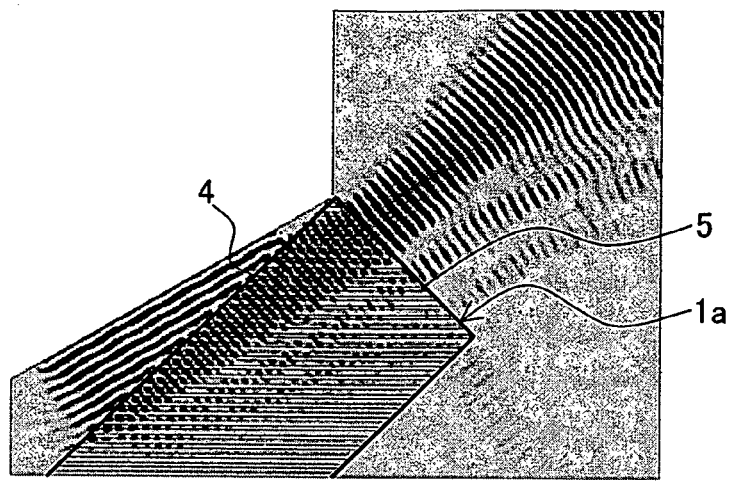
FIG. 6A is a diagram showing electric field strength distribution of light in the optical element of Example 1 of the present invention.
Figure 6B:
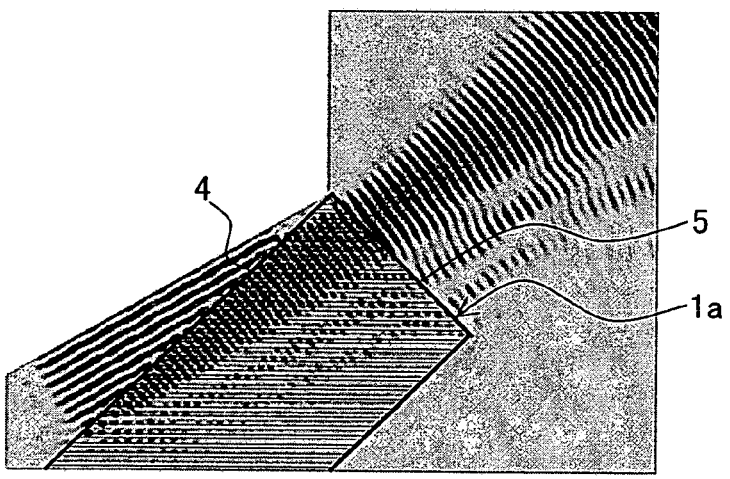
FIG. 6B is a diagram showing electric field strength distribution of light in the optical element of Example 1 of the present invention.
Figure 6C:
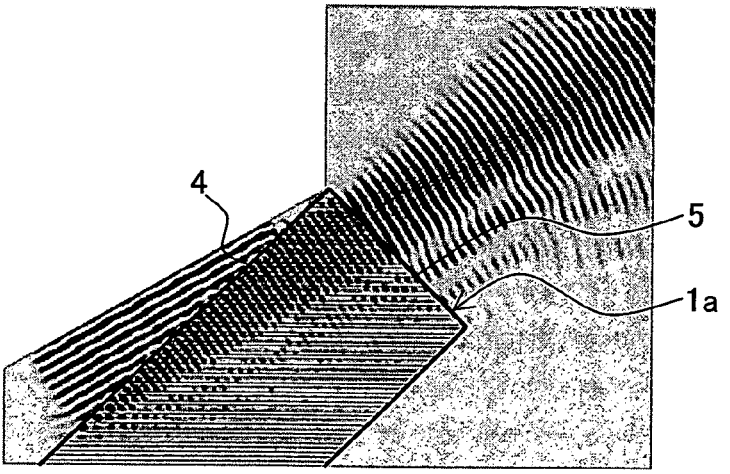
FIG. 6C is a diagram showing electric field strength distribution of light in the optical element of Example 1 of the present invention.
Figure 7A:
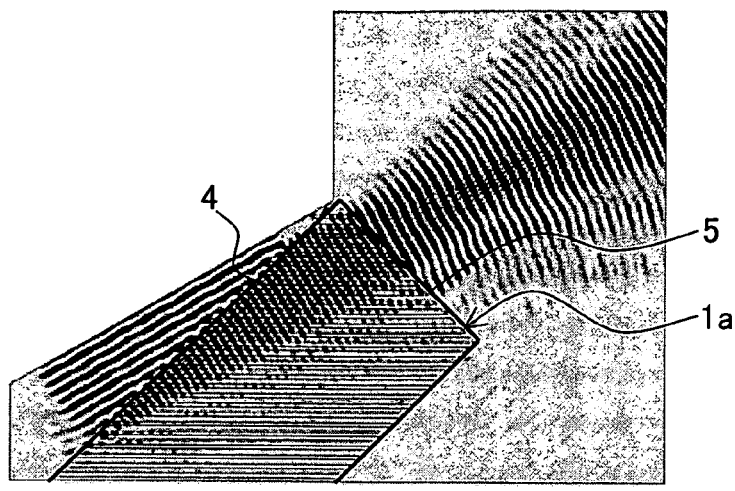
FIG. 7A is a diagram showing electric field strength distribution of light in the optical element of Example 1 of the present invention.
Figure 7B:
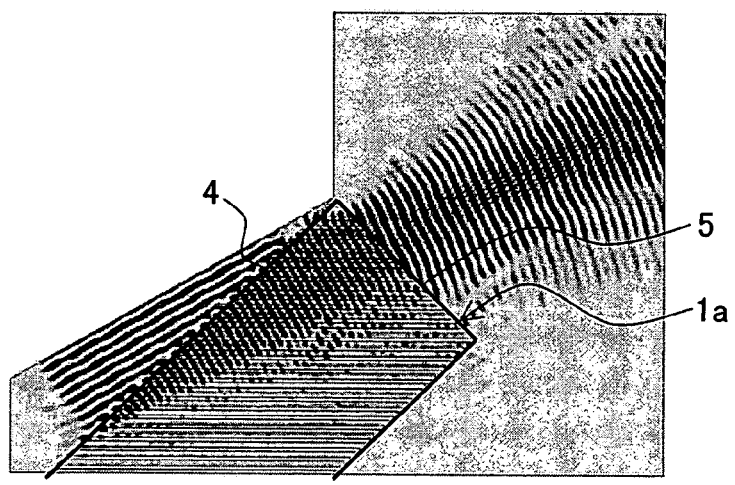
FIG. 7B is a diagram showing electric field strength distribution of light in the optical element of Example 1 of the present invention.
Figure 7C:
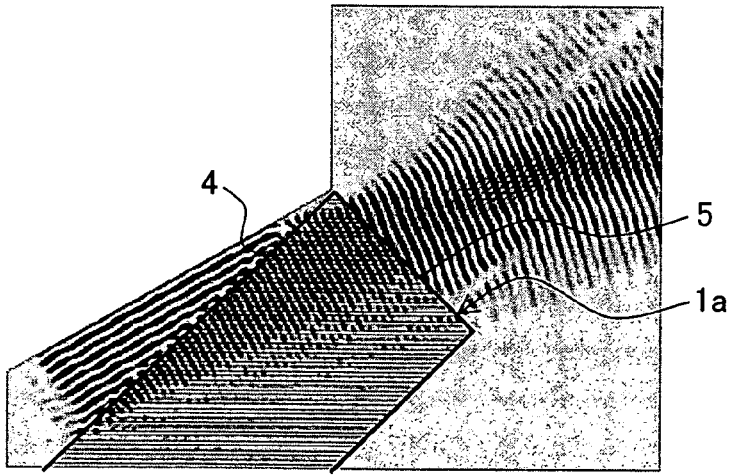
FIG. 7C is a diagram showing electric field strength distribution of light in the optical element of Example 1 of the present invention.
Figure 8A:
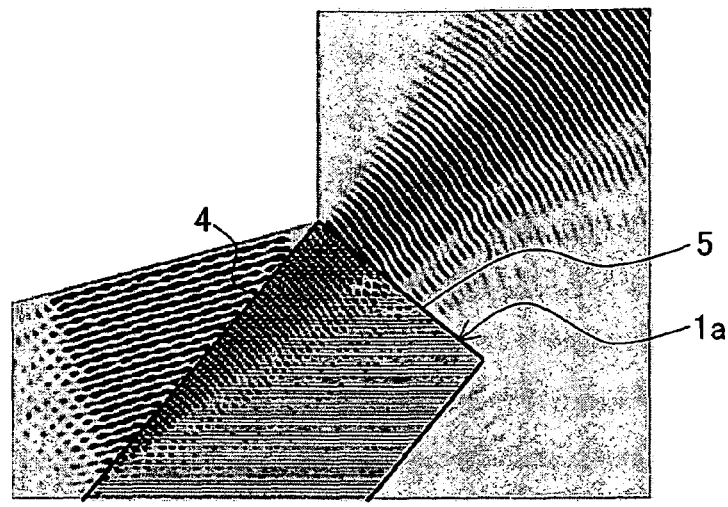
FIG. 8A is a diagram showing electric field strength distribution of light in the optical element of Example 2 of the present invention.
Figure 8B:
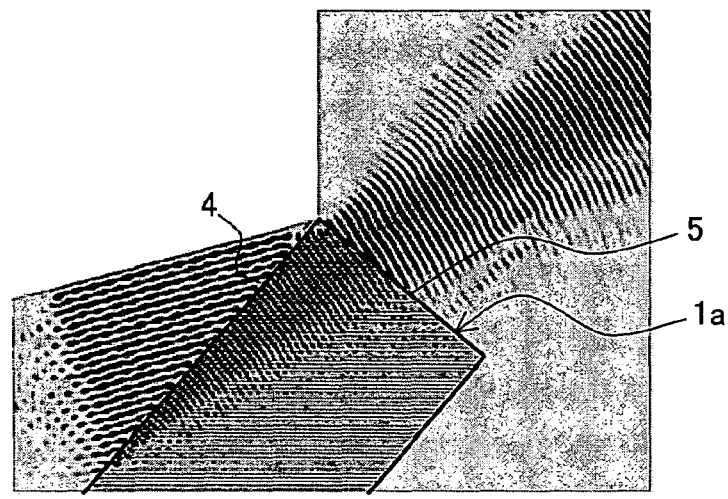
FIG. 8B is a diagram showing electric field strength distribution of light in the optical element of Example 2 of the present invention.
Figure 8C:
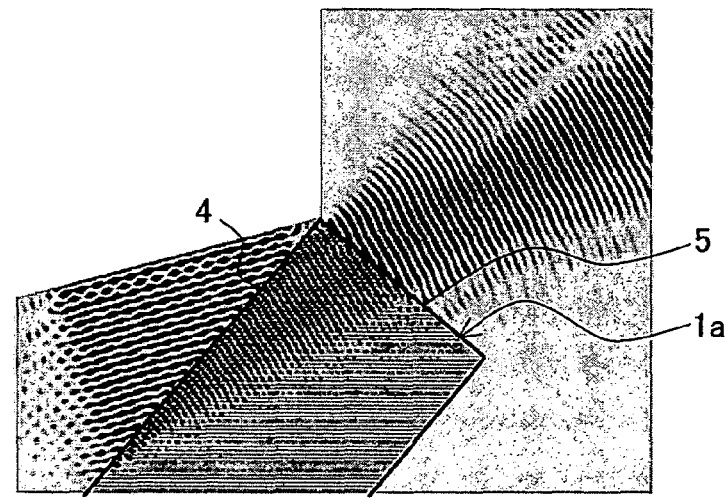
FIG. 8C is a diagram showing electric field strength distribution of light in the optical element of Example 2 of the present invention.
Figure 9A:
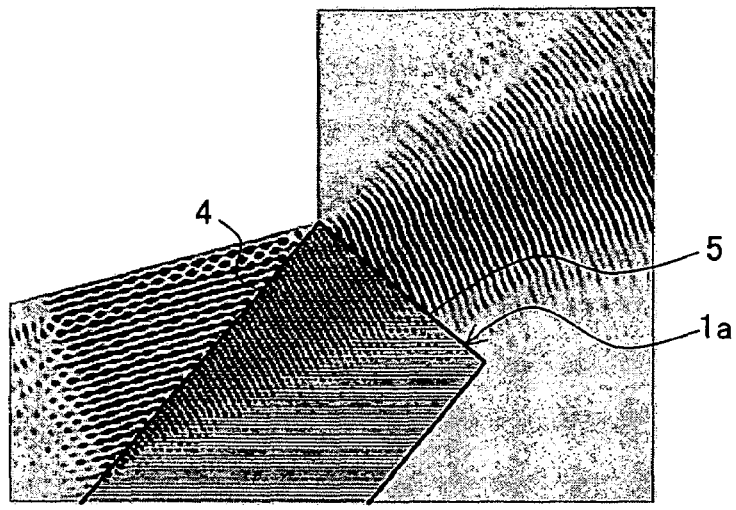
FIG. 9A is a diagram showing electric field strength distribution of light in the optical element of Example 2 of the present invention.
Figure 9B:
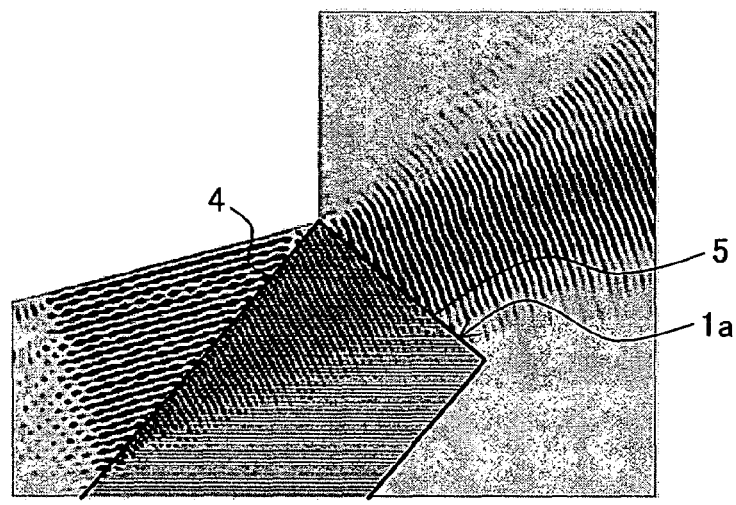
FIG. 9B is a diagram showing electric field strength distribution of light in the optical element of Example 2 of the present invention.
Figure 9C:
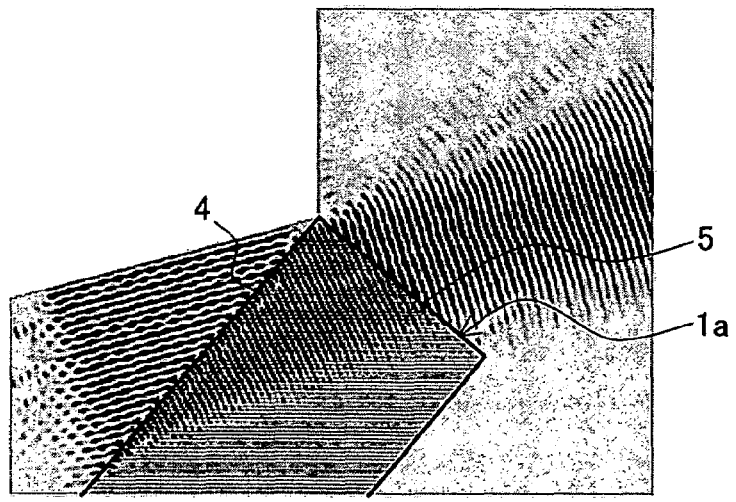
FIG. 9C is a diagram showing electric field strength distribution of light in the optical element of Example 2 of the present invention.
Figure 10:
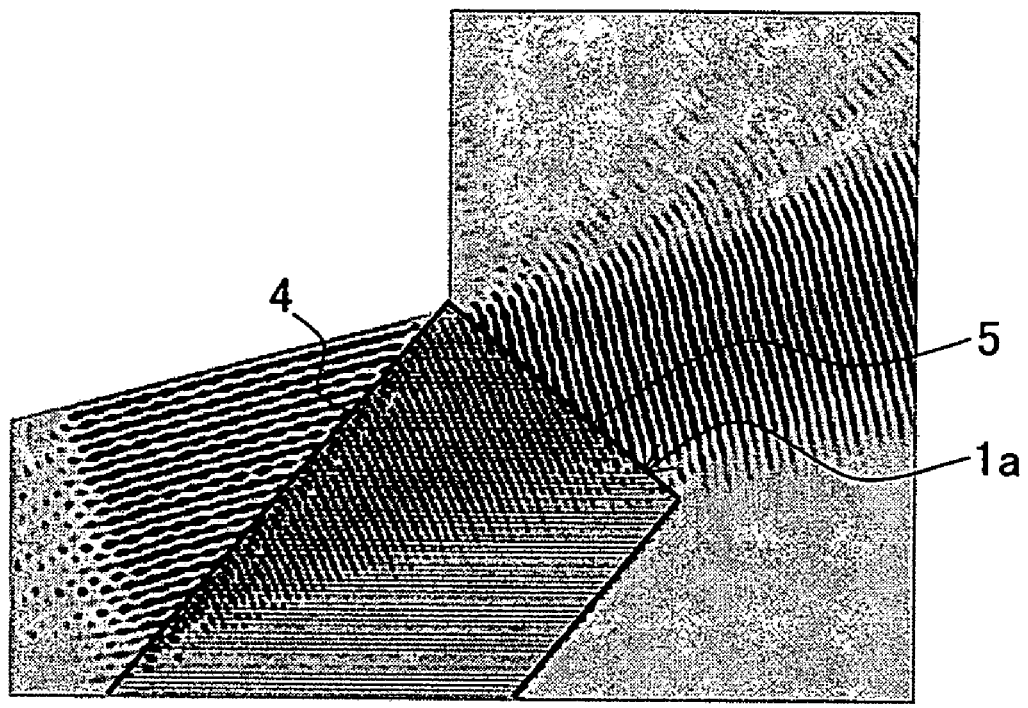
FIG. 10 is a diagram showing electric field strength distribution of light in the optical element of Example 2 of the present invention.

FIG. 5 is a band diagram showing the first Brillouin zone and the second Brillouin zone. Referring to FIG. 5, the following describes the propagation of light in the optical element 1a shown in FIG. 3. It should be noted that the conditions of the periodic structure of the optical element 1a are identical to those of the optical element 1 described above.

Two light beams having wavelengths of $\lambda_1$ and $\lambda_2$ are incident on the optical element 1a. Hereinafter the light beam having the wavelength of $\lambda_1$ is referred to as light beam $\lambda_1$, while the light beam having the wavelength of $\lambda_2$ is referred to as light beam $\lambda_2$. In FIG. 5, wave vectors of light beams incident on the optical element 1a are illustrated. Let a refractive index on the incident end face 4 side be $n_1$, and a magnitude of the wave vector of the light beam $\lambda_1$ is expressed as $n_1 \cdot (a/\lambda_1)$, while a magnitude of the wave vector of the light beam $\lambda_2$ is expressed as $n_1 \cdot (a/\lambda_2)$. It should be noted that the unit thereof is $2\pi/a$, which is the width of one Brillouin zone.

FIG. 5 shows a wave vector 401 of the light beam $\lambda_1$ and a wave vector 402 of the light beam $\lambda_2$. The wave vectors 401 and 402 have starting points on a normal 404 with respect to a line 403 expressing the incident end face and being inclined through an angle of $\psi_1$ with respect to the Z axis, the normal 404 passing the center of the first Brillouin zone. Since the wave vectors of the light beams $\lambda_1$ and $\lambda_2$ have magnitudes of $n_1 \cdot (a/\lambda_1)$ and $n_1 \cdot (a/\lambda_2)$, respectively, the wave vectors 401 and 402 have starting points on the centers of circles 421 and 422 having radii of $n_1 \cdot (a/\lambda_1)$ and $n_1 \cdot (a/\lambda_2)$, respectively, and have ending points on the circles 421 and 422, respectively. Since the light beams $\lambda_1$ and $\lambda_2$ are incident on the incident end face at an incident angle $\theta$, the respective wave vectors 401 and 402 of the light beams $\lambda_1$ and $\lambda_2$ are directed in a direction inclined through the incident angle $\theta$ with respect to the normal 404. A line 405 that passes the ending points of the wave vectors 401 and 402 and is parallel with the normal 404 is extended to the band diagram. It should be noted that there should be two lines that pass the ending points of the wave vectors 401 and 402, respectively, and are parallel with the normal 404. In this case, however, the two lines approximately fall on one line, and hence, only one line 405 is shown. Next, in the second Brillouin zone, points at which the line 405 crosses contour lines 407 and 408 indicating the normalized frequencies of the light beams $\lambda_1$ and $\lambda_2$, respectively, are determined. Normal directions with respect to the contour lines 407 and 408 at the crossing points of the line 405 and the contour lines 407 and 408 are directions in which the light beams propagate, respectively, in the optical element 1a. More specifically, a normal direction (indicated by an arrow 409) at a crossing point P at which the line 405 crosses the contour line 407 is a direction of propagation of the light beam $\lambda_1$. Likewise, a normal direction (indicated by an arrow 410) at a crossing point Q at which the line 405 crosses the contour line 408 is a direction of propagation of the light beam $\lambda_2$.

Next, the following describes wave vectors of light outgoing from the optical element 1a. Respective wave vectors 418 and 419 of the light beams $\lambda_1$ and $\lambda_2$ when outgoing from the optical element 1a have starting points on a normal 412 with respect to a line 411 expressing the output end face and being inclined through an angle of $\psi_2$ with respect to the Z axis, the normal 412 passing the center of the second Brillouin zone. Let a refractive index on the output end face 5 side be $n_2$, and circles 414 and 415 are assumed that have centers on the starting points of the wave vectors 418 and 419 of the light beams $\lambda_1$ and $\lambda_2$, respectively, and that have radii of $n_2 \cdot (a/\lambda_1)$ and $n_2 \cdot (a/\lambda_2)$, respectively. Further, a line is extended from the center of the circle 414 as the starting point to a crossing point at which a line 416 passing the crossing point P and being parallel with the normal 412 crosses the circle 414, whereby a wave vector 418 of the light beam $\lambda_1$ upon outgoing is determined. Likewise, a line is extended from the center of the circle 415 as the starting point to a crossing point at which a line 417 passing the crossing point Q and being parallel with the normal 412 crosses the circle 415, whereby a wave vector 419 of the light beam $\lambda_2$ upon outgoing is determined. An angular difference $\phi_1$, i.e., an angle formed between the wave vector 418 and the wave vector 419, is a difference between respective output angles of the light beams $\lambda_1$ and $\lambda_2$ upon outgoing. As the difference increases, the wavelength resolution is enhanced, whereby the wavelength separator has higher performance.

As described above, it is evident that in the propagation through the optical element 1a, the angular difference $\phi_1$ between light beams having different wavelengths is increased by using the band in the second Brillouin zone. It should be noted that in the propagation using the band on the boundary between the first and second Brillouin zones, light is propagated through the optical element 1a in the Z-axis direction. In such propagation, light beams outgo at different angles, but substantial wavelength dispersion cannot be obtained.

Therefore, as is described above, in the propagation of light through the optical element 1a, the increase in the difference between the output angles can be achieved by the use of a band within the second Brillouin zone exclusive of a boundary between the first and second Brillouin zones as the band with which the light is coupled, as well as the configuration in which the incident end face 4 and the output end face 5 are orthogonal to each other. In other words, the incident end face 4 and the output end face 5 being orthogonal to each other signifies that the normal 404 and the normal 412 are orthogonal to each other in FIG. 5. This configuration allows a displacement of the crossing point P from the crossing point Q to be reflected most effectively by angles, whereby the angular difference $\phi_1$ increases.

The following describes results of electromagnetic wave simulation performed regarding the propagation of light in the optical element 1a of Embodiment 1, the propagation utilizing the band within the second Brillouin zone exclusive of a boundary between the first and second Brillouin zone as the band with which the light is coupled. In the simulation, the finite element method was used.

EXAMPLE 1

The following describes Example 1 in which the propagation in the optical element $1a$ (see FIG. 3) according to Embodiment 1 was determined by simulation. The optical element $1a$ was a periodic structure in which a substance having a refractive index of 1.45 and a substance having a refractive index of 1.00 were provided alternately with uniform thicknesses. The structure had an incident end face $4$ inclined through an angle $\psi_1$ of $45°$ and a period a of 1000 (nm). The simulation was performed with an incident angle $\theta$ of an incident light beam $7$ being fixed to $15°$, and with a wavelength $\lambda_0$ of the incident light beam $7$ being varied from a/0.460 to a/0.485.

Resultant output angles $\phi$ of outgoing light beams corresponding to the foregoing respective wavelengths are shown in Table 1. It should be noted that the output angle $\phi$ is an angle formed between the Z-axis direction and the outgoing light beam.

TABLE 1

| No. | a/$\lambda_0$ | Wave length $\lambda_0$ | Output angle $\phi$ (deg) |
| --- | --- | --- | --- |
| 1 | 0.460 | 2173.91 | 43.5 |
| 2 | 0.465 | 2150.54 | 37.5 |
| 3 | 0.470 | 2127.66 | 33.9 |
| 4 | 0.475 | 2105.26 | 28.7 |
| 5 | 0.480 | 2083.33 | 24.5 |
| 6 | 0.485 | 2061.86 | 21.7 |

As shown in Table 1, a change in the output angle of the outgoing light beam with respect to a wavelength difference of 1 percent in the optical element $1a$ was $4.0°$ or more, which indicates that a significantly wide wavelength dispersion was obtained. It should be noted that in a normal glass prism, a change in an output angle of an outgoing light beam with respect to a wavelength difference of 1 percent was $0.1°$ or less.

FIGS. 6A to 6C and FIGS. 7A to 7C are diagrams showing the electric field strength distribution of light in the optical element of Example 1 of the present invention, which are electric field strength distribution diagrams corresponding to Table 1. No. 1, No. 2, No. 3, No. 4, No. 5, and No. 6 of Table 1 correspond to FIG. 6A, FIG. 6B, FIG. 6C, FIG. 7A, FIG. 7B, and FIG. 7C, respectively. In each diagram, black portions indicate portions where light had a greater intensity. As is clear from each diagram, in the optical element $1a$, the propagated light arrived at the output end face $5$ without attenuation, whereby high output efficiency was obtained. Besides, it can be observed also that the output angle of the light outgoing from the output end face $5$ significantly varied with the variation of the wavelength of the incident light.

EXAMPLE 2

The following describes Example 2 in which the propagation in the optical element $1a$ according to Embodiment 1 was determined by simulation. The optical element $1a$ was a periodic structure in which a substance having a refractive index of 1.45 and a substance having a refractive index of 1.00 were provided alternately with uniform thicknesses. The structure had an incident end face $4$ inclined through an angle $\psi_1$ of $50°$ and a period a of 1000 (nm). The simulation was performed with an incident angle $\theta$ of an incident light beam $7$ being fixed to $35°$, and with a wavelength $\lambda_0$ of the incident light beam $7$ being varied from a/0.420 to a/0.450. Resultant output angles $\phi$ of outgoing light beams corresponding to the foregoing respective wavelengths are shown in Table 2.

TABLE 2

| No. | a/$\lambda_0$ | Wave length $\lambda_0$ | Output angle $\phi$ (deg) |
| --- | --- | --- | --- |
| 1 | 0.420 | 2380.95 | 37.5 |
| 2 | 0.425 | 2352.94 | 31.5 |
| 3 | 0.430 | 2325.58 | 27.5 |
| 4 | 0.435 | 2298.85 | 24.3 |
| 5 | 0.440 | 2272.73 | 21.2 |
| 6 | 0.445 | 2247.19 | 18.5 |
| 7 | 0.450 | 2222.22 | 14.0 |

As shown in Table 2, a change in the output angle of the outgoing light beam with respect to a wavelength difference of 1 percent in the optical element $1a$ was $3.0°$ or more, which indicates that a significantly wide wavelength dispersion was obtained, like in Example 1.

FIGS. 8A to 8C, FIGS. 9A to 9C, and FIG. 10 are diagrams showing the electric the field strength distribution of light in the optical element of Example 2 of the present invention, which are electric field strength distribution diagrams corresponding to Table 2. No. 1, No. 2, No. 3, No. 4, No. 5, No. 6, and No. 7 of Table 2 correspond to FIG. 8A, FIG. 8B, FIG. 8C, FIG. 9A, FIG. 9B, FIG. 9C, and FIG. 10, respectively. As is clear from each diagram, in the optical element $1a$, the propagated light arrived at the output end face $5$ without attenuation, whereby high output efficiency was obtained. Besides, it can be observed that the output angle of the light outgoing from the output end face $5$ significantly varied with the variation of the wavelength of the incident light.

Thus, the optical elements $1$ and $1a$ of Embodiment 1 have a wide wavelength dispersion by providing the propagation of light in which a band in the second Brillouin zone exclusive of a boundary between the first and second Brillouin zones as the band with which light is coupled is utilized. Further, the optical element of Embodiment 1 has a simple configuration, thereby allowing the size reduction and the easier manufacture thereof. Accordingly, in the case where a wavelength separator is produced by utilizing the foregoing optical element, the wavelength separator is provided in a smaller size with higher wavelength resolution.

Further, in the optical element $1$ of Embodiment 1, since the incident end face $4$ and the output end face $5$ are inclined with respect to the grooves $3$, the incident end face $4$ and the output end face $5$ are enlarged effectively. This provides greater beam diameters of the incident light beam and the outgoing light beam, thereby suppressing diversion of the beams, and hence, enhancing the wavelength resolution.

Figure 11:
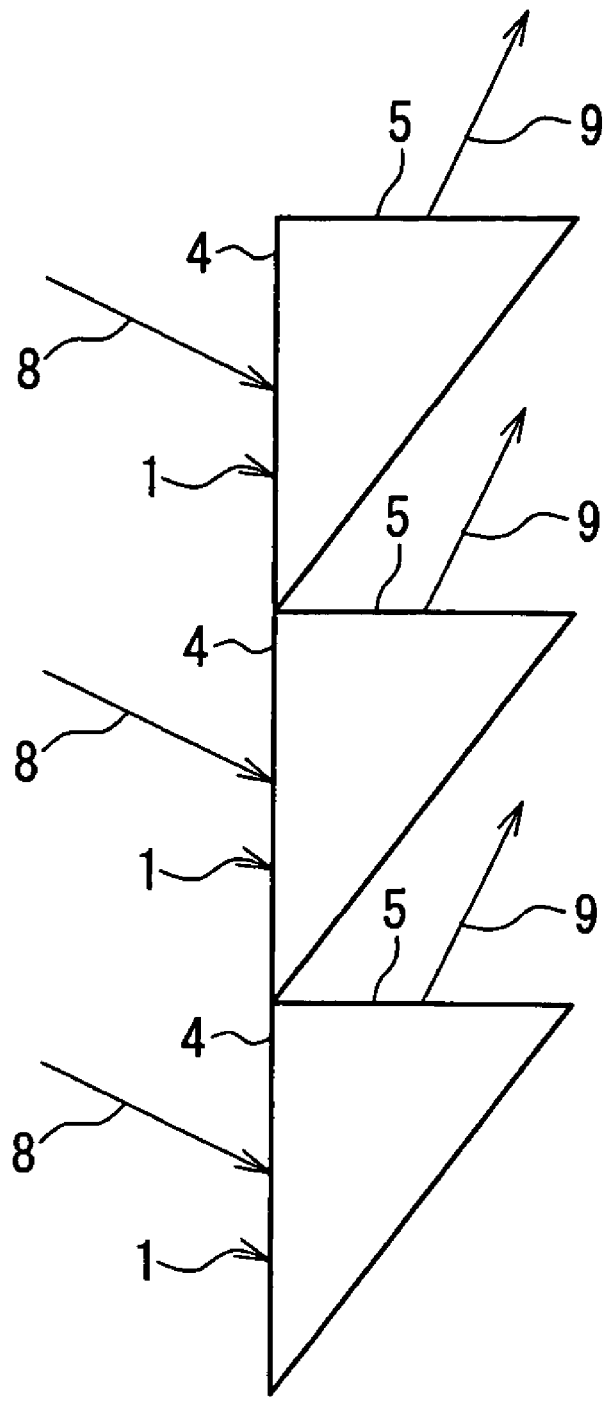
FIG. 11 is a plan view illustrating a configuration of another optical element according to Embodiment 1 of the present invention.

Still further, a plurality of the optical elements $1$ may be used so that the incident end faces $4$ thereof constitute the same plane as shown in FIG. 11, for instance. FIG. 11 is a plan view illustrating a configuration of another optical element according to Embodiment 1 of the present invention. This configuration allows the incident light beams $8$ to have increased beam diameters. Further, since outgoing light beams $9$ outgo from the output end faces $5$, respectively, a luminous flux can be broadened, whereby the wavelength resolution is enhanced.

EMBODIMENT 2

Figure 12:
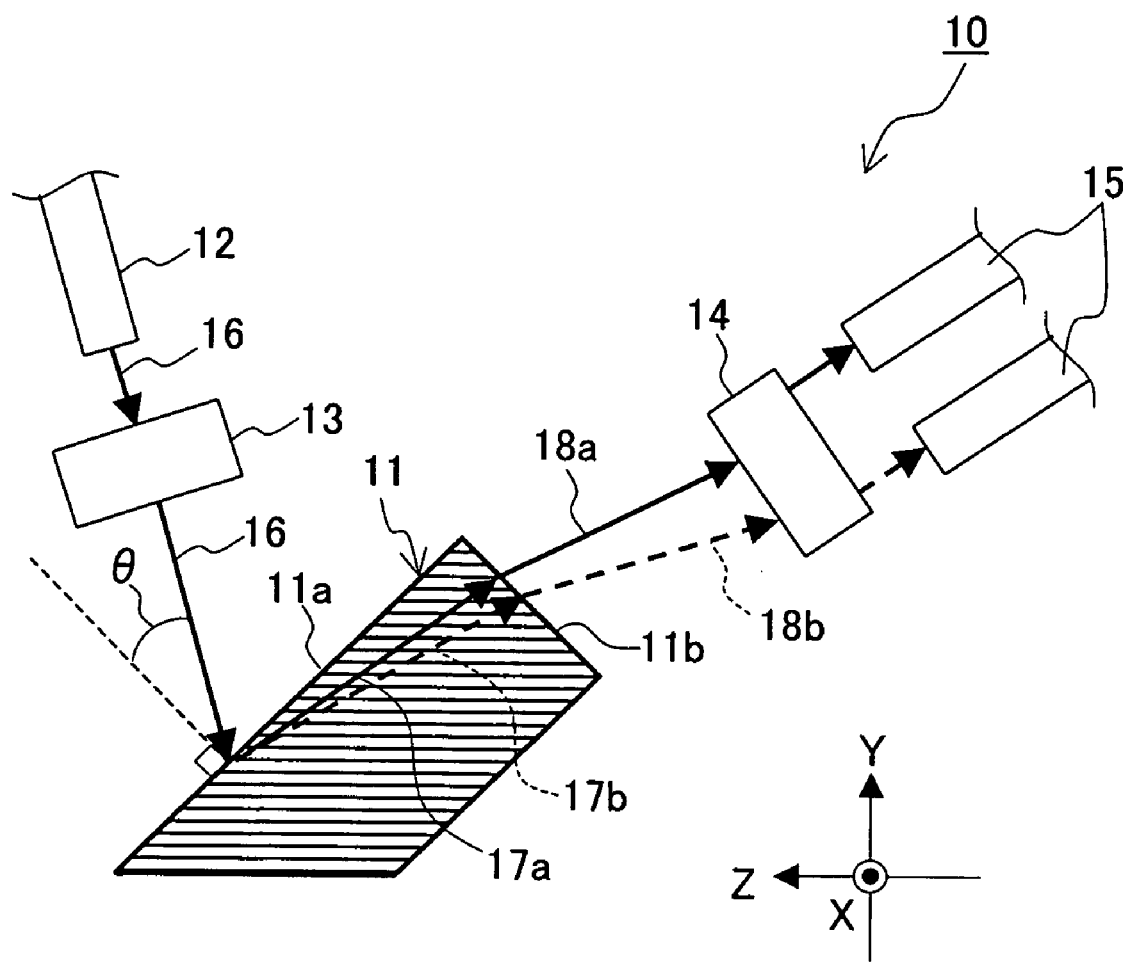
FIG. 12 is a plan view illustrating a configuration of a wavelength separator according to Embodiment 2 of the present invention.

The following describes a wavelength separator according to Embodiment 2 of the present invention while referring to FIG. 12. The wavelength separator according to Embodiment 2 is composed of the optical element according to Embodiment 1. FIG. 12 is a plan view illustrating a configuration of the wavelength separator according to Embodiment 2 of the present invention.

In FIG. 12, the wavelength separator 10 includes an input section including an input-side optical fiber 12 (input-side optical waveguide part) and a collimating lens 13 (collimator part), an optical element 11 having the same configuration as that of the optical elements 1 and 1a (see FIGS. 1 and 3) described in the description of Embodiment 1, and an output section including a focusing lens 14 (focusing part) and a plurality of output-side optical fibers 15 (output-side optical waveguide parts).

An incident light beam 16 propagates through the input-side optical fiber 12, is converted into an approximately collimated luminous flux by the collimating lens 13, and is incident on the optical element 11. The incident light beam 16 contains a plurality of light beams having different wavelengths. It should be noted that in FIG. 12 the incident light beam 16 is composed of two types of light beams.

The input-side optical fiber 12 and the collimating lens 13 are disposed in a manner such that the collimating lens 13 causes the incident light beam 16 to be incident on the incident end face 11a at an incident angle θ. The incident angle θ is set to a value such that light beams 17a and 17b coupled with a band within the second Brillouin zone are generated and propagate through the optical element 11. Such a value of the incident angle θ is determined based on the wavelengths of light beams included in the incident light beam 16 by utilizing the band diagrams referred to in the description of Embodiment 1.

By utilizing the foregoing band diagrams, output angles of the outgoing light beams 18a and 18b as luminous fluxes outgoing from the optical element 11 can be derived. Then, the focusing lens 14 is disposed at a position at which the outgoing light beams 18a and 18b outgo, so that the outgoing light beams 18a and 18b are incident on different output-side optical fibers 15, respectively, and propagate therethrough.

Thus, by utilizing the optical element according to Embodiment 1, the wavelength separator 10 can be provided in a simpler configuration so that it has enhanced wavelength resolution and it can be formed in a smaller size. In Embodiment 2, the light beam is separated into two, but can be separated into more, in which case the number of the output-side optical fibers 15 is determined according to the number of light beams to be obtained by separation. It should be noted that in Embodiment 2, a plurality of output light beams 18a and 18b are focused by one output-side focusing lens 14, but the same number of focusing lenses 14 as the number of light beams to be obtained by separation may be prepared so as to focus the obtained light beams, respectively. Further, the input-side optical fiber 12 and the plurality of output-side optical fibers 15 may be anything as long as they propagate the incident light beam 16 and the outgoing light beams 18a and 18b propagate therethrough, respectively; for instance, they may be optical waveguides, or the like. Still further, the collimating lens 13 may be anything as long as it has a function of collimating light (converting light into parallel light beam). Still further, the focusing lens 14 may be anything as long as it has a function of focusing light. The collimating lens 13 and the focusing lens 14 may be, for example, concave mirrors, or the like.

A wavelength separator similar to the wavelength separator 11 of Embodiment 2 was produced actually, and properties thereof were determined. The results are shown in Example 3 below. In Example 3, the optical element was configured to have claddings.

EXAMPLE 3

Figure 13:
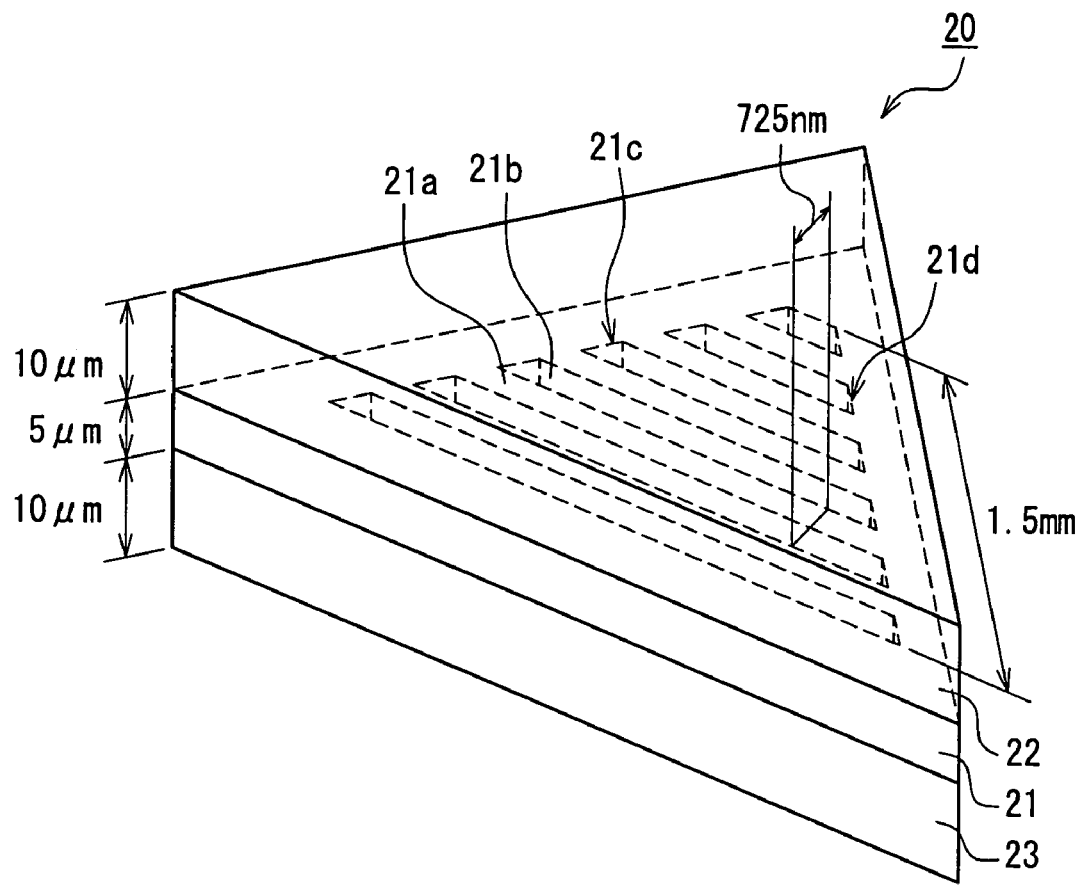
FIG. 13 is a perspective view illustrating a configuration of an optical element used in Example 3 of the present invention.

FIG. 13 is a perspective view illustrating a configuration of an optical element used in Example 3 of the present invention. The optical element 20 used in Example 3 includes a homogeneous medium 21a, and the homogeneous medium 21a includes a one-dimensional photonic crystal structure formed by providing a plurality of grooves (spaces) 21b parallel with one another at uniform intervals. Further, the optical element 20 has an incident end face 21c formed obliquely with respect to a direction along the grooves 21b (Z-axis direction), and an output end face 21d approximately perpendicular to the incident end face 21c.

The optical element 20 further includes claddings 22 and 23 between which the homogeneous medium 21 is provided, the three being stacked in the depth direction of the grooves 21b (X-axis direction). With this configuration, the homogeneous medium 21 functions as a core with respect to the claddings 22 and 23. Therefore, light propagating through the homogeneous medium 21 hardly leaks in the X-axis direction.

Figure 14:
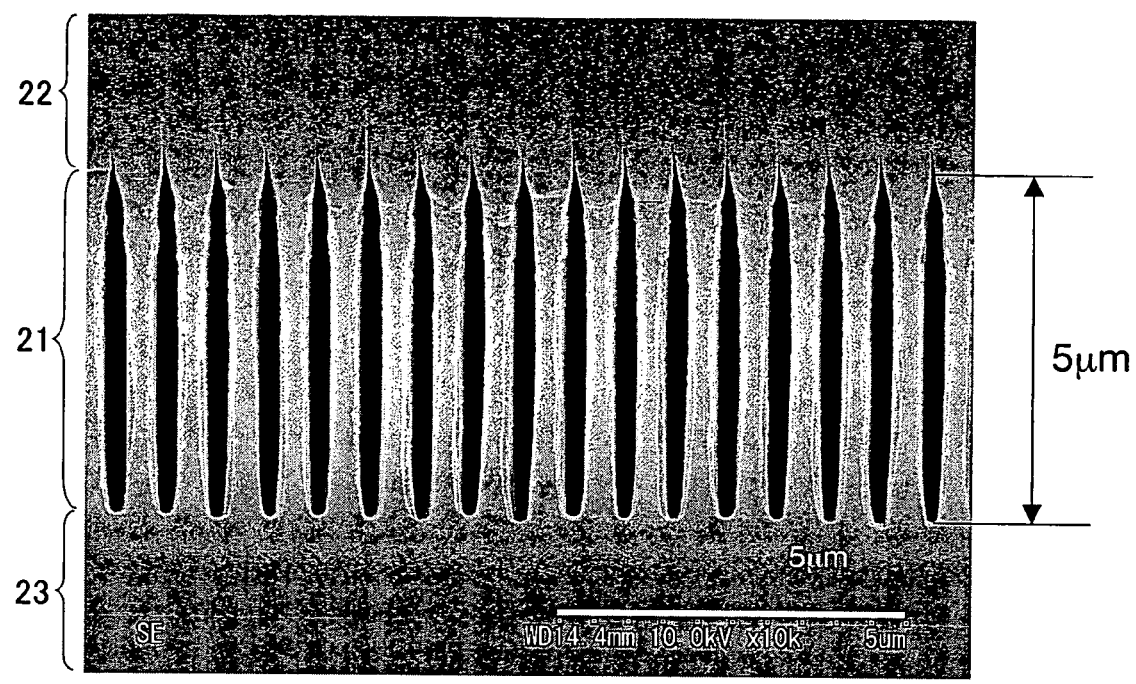
FIG. 14 is a photograph illustrating a cross section of the optical element used in Example 3 of the present invention, the cross section being taken along an X-Y plane.

In the optical element 20, the one-dimensional photonic crystal included in the homogeneous medium 21 has a period of a refractive index of 725 nm, and the thickness of the homogeneous medium 21 as a core and the depth of the grooves 21b are 5 μm each. The grooves 21b are formed by patterning and dry etching performed by electron beam drawing, in the homogeneous medium 21 formed on the cladding 23. After forming the grooves 21b, the cladding 22 is formed on the homogeneous medium 21 by PECVD (plasma enhanced chemical vapor deposition), with the spaces as the grooves 21b being left. The claddings 22 and 23 have a thickness of 10 μm each. The output end face 21d had a width of 1.5 mm. FIG. 14 is a photograph showing a cross section taken along an X-Y plane of the optical element 20 used in Example 3 of the present invention. In FIG. 14, portions imaged in black, provided in parallel with one another, are the grooves 21b. In FIG. 14, it can be observed that the claddings 22 and 23 are formed with the grooves 21b remaining in the homogeneous medium 21.

Figure 15:
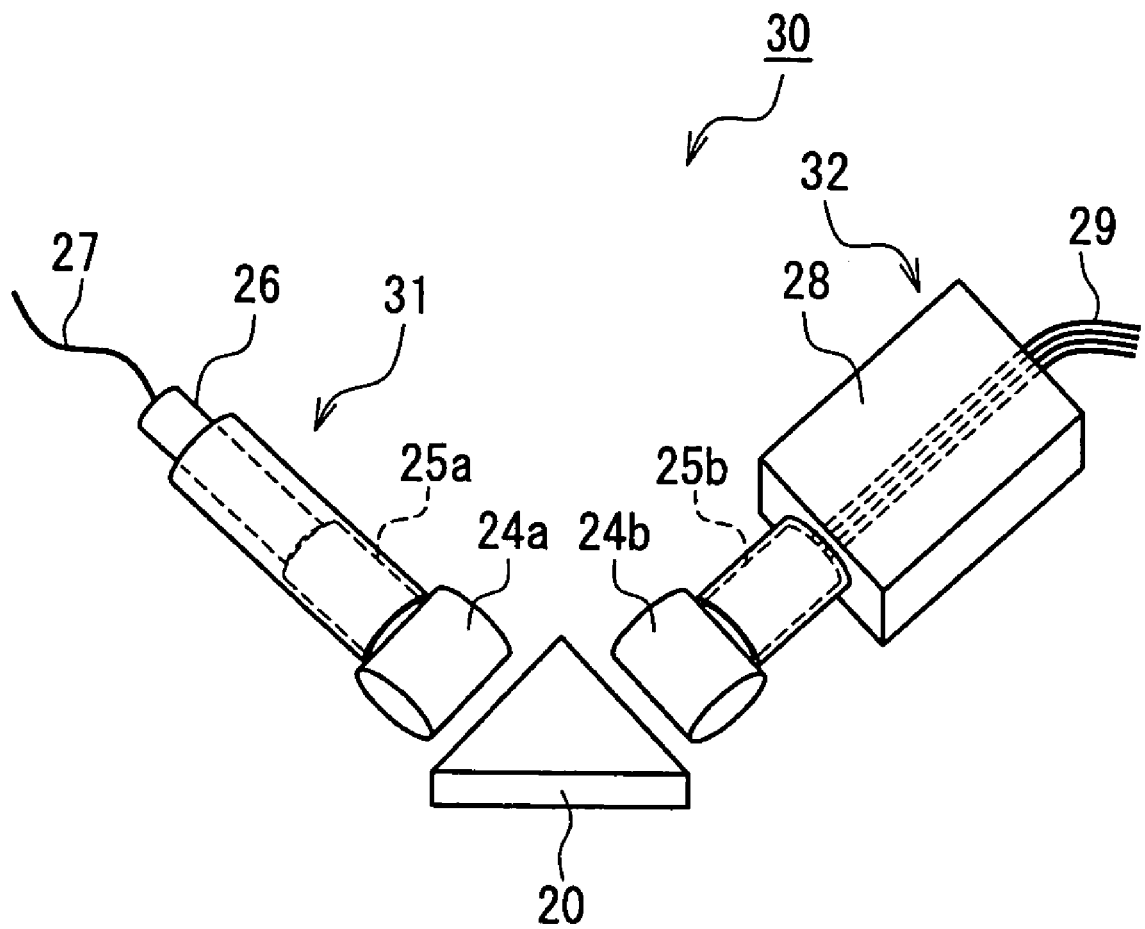
FIG. 15 is a perspective view illustrating a configuration of a wavelength separator used in Example 3 of the present invention.

The wavelength separator used in Example 3 is configured to include the foregoing optical element 20. FIG. 15 is a perspective view illustrating a configuration of the wavelength separator used in Example 3 of the present invention. As shown in FIG. 15, the wavelength separator 30 of Example 3 includes the optical element 20, a light input section 31, and a light output section 32. The input section 31 includes a polarized wave holding fiber 27 (input-side optical waveguide part), a cylindrical lens 25a (collimator part), rod lens 24a (collimator part), and a glass capillary 26 disposed between the polarized wave holding fiber 27 and the cylindrical lens 25a. It should be noted that the glass capillary 26 is intended to hold a core of the polarized wave holding fiber 27, and connects the polarized wave holding fiber 27 with the cylindrical lens 25a.

Further, the output section includes a rod lens 24b (focusing part), a cylindrical lens 25b (focusing part), and a four-core fiber array 28 including four single mode fibers 29 (output-side optical waveguide parts). In the four-core fiber array 28, the four single mode fibers 29 are arranged so that their cores are disposed at uniform distances from one another. It should be noted that the core distance of the single mode fibers 29 of the four-core fiber array 28 used in Example 3 is 127 µm. SELFOC (registered trademark) micro lenses manufactured by Nippon Sheet Glass Company, Limited were used for forming the cylindrical lenses 25a and 25b.

The following describes the behaviors of the foregoing wavelength separator 30. Incident light having a plurality of wavelengths propagates through the polarized wave holding fiber 27, and is incident on the cylindrical lens 25a and the rod lens 24a. The incident light is collimated by the cylindrical lens 25a and the rod lens 24a, and is incident on the optical element 20. It should be noted that the incident light is incident on the optical element 20 in a manner such that light to propagate through the optical element 20 should be coupled with a photonic band within the second Brillouin zone exclusive of a boundary between the first and second Brillouin zones. Outgoing light outgoes from the optical element 20 in a manner such that light beams included in the light outgo at output angles different from one another depending on their wavelengths, respectively. The outgoing light beams are focused onto cores of the single mode fibers 29 provided in the four-core fiber array 28, respectively, by the rod lens 24b and the cylindrical lens 25b, and the outgoing light beams propagate through the single mode fibers 29. It should be noted that since the four-core fiber array 28 is used in the wavelength separator 30, the incident light can be separated into four light beams.

Figure 16:
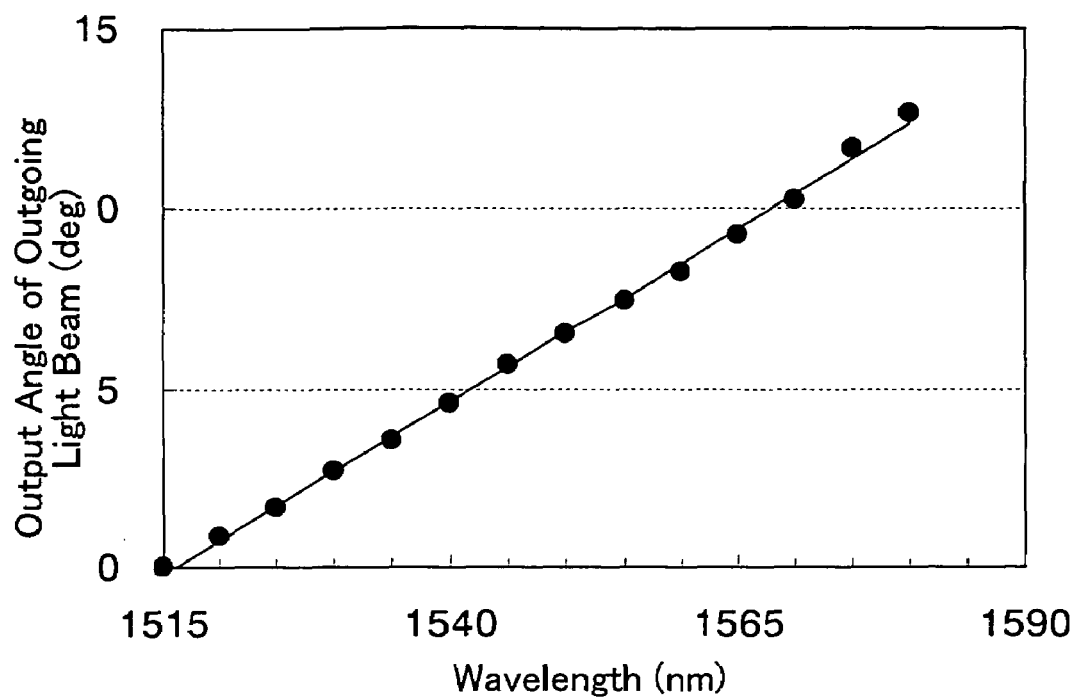
FIG. 16 is a graph showing the relationship between an angle of an outgoing light beam and a wavelength thereof.

First, angular dispersion of the wavelength separator 30 was evaluated by using visible infrared light with a wavelength of 1510 nm to 1590 nm as a light source. Light was caused to propagate from the light source (not shown) through the polarized wave holding fiber 27, with a setting such that polarized light outgoing from the polarized wave holding fiber 27 was TE polarized light. The light was incident on the cylindrical lens 25a and the rod lens 24a where the light was collimated and was focused in a thickness direction of the core so as to be in linear form whose cross section has a size of 5×220 µm, and was incident on the optical element 20. The light incident on the optical element 20 outwent from the optical element 20 in a manner such that the light beams included in the light outwent at different output angles depending on their wavelengths, respectively. On the output end side of the optical element 20, not the light output section 32 but an f-θ lens and an infrared CCD camera were disposed so that output angles of the outgoing light beams were measured. FIG. 16 is a graph showing the relationship between the output angle of the outgoing light beams and the wavelength thereof. It should be noted that the graph of FIG. 16 uses the angle when the wavelength was 1515 nm as the reference. As shown in FIG. 16, the angle variation of the outgoing light is linear with respect to the wavelength variation. Besides, a change in the angle of the outgoing light with respect to a change of 1% in the wavelength was 3.4°. This value is slightly smaller than the value derived from the simulation of Example 1, but this is deemed to be due to a production error, incompatibility with a refractive index of the homogeneous medium 21 as a core with refractive indices of the claddings 22 and 23, or the like.

Figure 17:
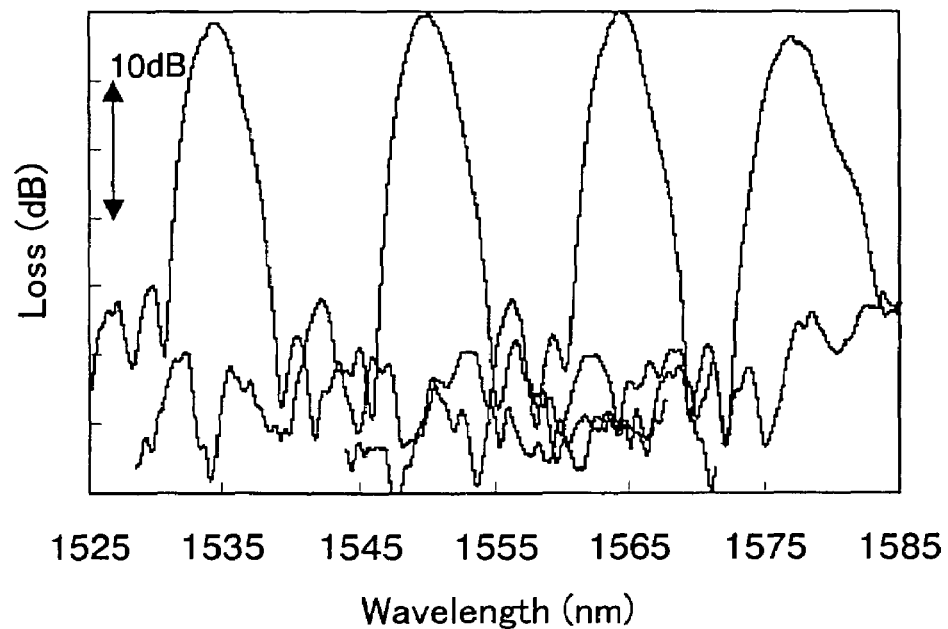
FIG. 17 is a graph showing the relationship between loss and a wavelength.

Next, in the wavelength separator 30 shown in FIG. 15, visible infrared light with a wavelength in a range of 1510 nm to 1590 nm was caused to propagate through the polarized wave holding fiber 27, and outgoing light beams were coupled with the cores of the single mode fibers 29 of the four-core fiber array 28. It should be noted that the distance from one core to another of the single mode fibers 29 was set to be 127 µm. Outgoing light beams from the single mode fibers 29 in this wavelength separator 30 were analyzed by a vector analyzer, and a graph of FIG. 17 showing the relationship between the loss and the wavelength was obtained. In FIG. 17, the vertical axis indicates the loss, and is calibrated in 5 dB increments. As shown in FIG. 17, the outgoing light had transmittance output with peak intervals of 15 nm each. In FIG. 17, there are four peak values. In other words, it shows that the light was separated into four light beams having wavelengths of the foregoing peak values, respectively. In Example 3, the wavelength interval of the separated outgoing light beams was 15 nm, but it also is possible to set the wavelength interval of the separated outgoing light beams to be 20 nm, by optimizing the diameter of the rod lens 24b and the focal length of the cylindrical lens 25b.

EMBODIMENT 3

Figure 18A:
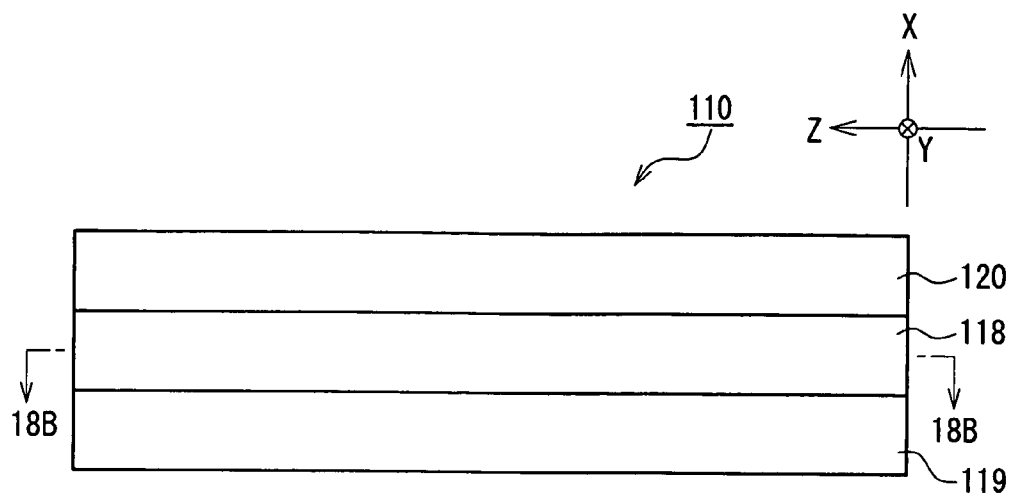
FIG. 18A is a diagram illustrating a configuration of a wavelength separator according to Embodiment 3 of the present invention, which is a side view of the wavelength separator of Embodiment 3.
Figure 18B:
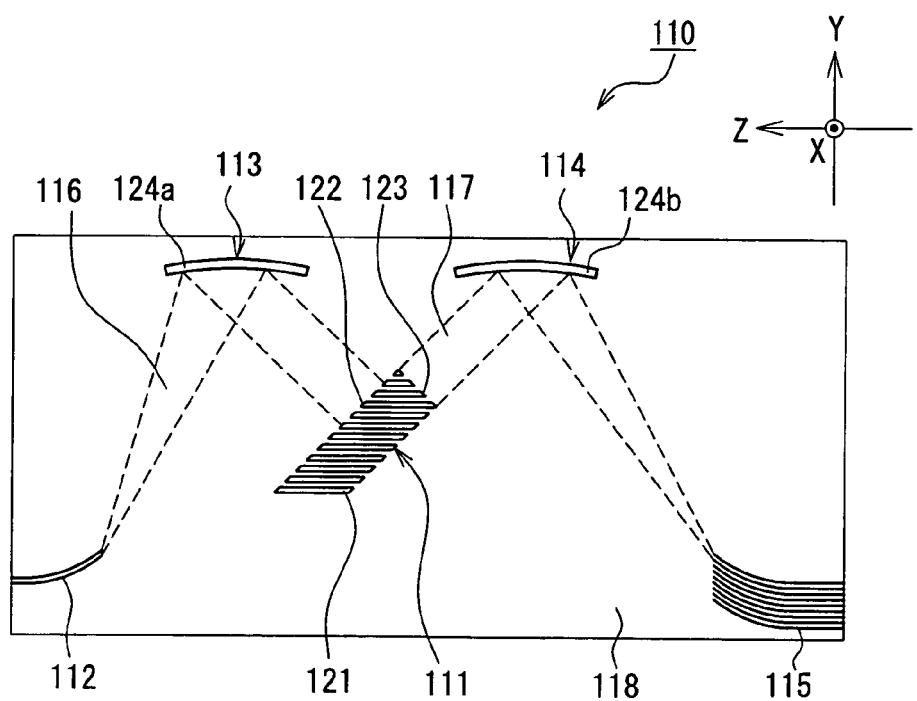
FIG. 18B is a diagram illustrating the configuration of the wavelength separator according to Embodiment 3 of the present invention, which is a cross-sectional view taken along an arrow line 18B-18B in FIG. 18A.

The following describes a wavelength separator according to Embodiment 3 of the present invention while referring to drawings. FIGS. 18A and 18B illustrate a configuration of the wavelength separator according to Embodiment 3 of the present invention. FIG. 18A is a side view of the wavelength separator according to Embodiment 3, while FIG. 18B is a cross-sectional view of the element of FIG. 18A taken along an arrow line 18B-18B, viewed in a direction indicated by the arrows. As shown in FIGS. 18A and 18B, a wavelength separator 110 according to Embodiment 3 is configured so that an optical element 111 having the same configuration as that of the optical elements 1 and 1a according to Embodiment 1 (see FIGS. 1 and 3) is formed in an optical waveguide formed with two claddings 119 and 120 and a core 118 that is a homogeneous medium provided between the claddings 119 and 120. More specifically, the optical element 111 having the same configuration as that of the optical element 1 of Embodiment 1 is formed by forming grooves in the core 118, and further, an input section including an input channel waveguide 112 (input-side optical waveguide part) and input-side concave mirror 113 (collimating part), as well as an output section including an output-side concave mirror 114 (focusing part) and a plurality of output channel waveguides 115 (output-side optical waveguide parts), are formed in the core 118.

As shown in FIG. 18B, in the core 118, a plurality of grooves 121 are formed in parallel with one another at uniform intervals, and an input end face 122 inclined obliquely with respect to the grooves 121 and an output end face 123 perpendicular to the input end face 122 are formed, whereby the optical element 111 having the same configuration as the optical element of Embodiment 1 described above is formed.

Further, curved grooves 124a and 124b are formed in the core 118. These grooves 124a and 124b are configured so that total internal reflection occurs at boundary faces between the core 118 and the spaces formed by the grooves 124a and 124b. This configuration allows the input-side concave mirror 113 and the output-side concave mirror 114 to be formed by the grooves 124a and 124b, respectively.

Further, by forming grooves in the core 118 and filling the grooves with a medium having a refractive index higher than that of the core 118, light can be confined in those portions and caused to propagate therethrough. Accordingly, the input channel waveguide 112 and the plurality of output channel waveguides 115 are formed by forming grooves in the core 118 and filling the grooves with a medium having a refractive index higher than that of the core 118. This wavelength separator 110 according to Embodiment 3, utilizing the optical element 111 having the same configuration as that of the optical element of Embodiment 1 described above, therefore has high wavelength resolution and can be reduced in size.

The incident light 116 having been input from the outside and having propagated through the input channel waveguide 112 is converted into approximately collimated light by the input-side concave mirror 113, is incident on the optical element 111, and propagates the optical element 111. The light outgoes at different angles according to the wavelengths, and the outgoing light beams 117 having different wavelengths, respectively, are focused at the output-side concave mirror 114, propagate through the plurality of output channel waveguides 115 according to their wavelengths, respectively, and are outputted from the wavelength separator 110.

Here, the input channel waveguide 112 and the input-side concave mirror 113 are disposed so that the incident light 116 is incident on the optical element 111 at an incident angle such that the incident light 116 is coupled with a band within the second Brillouin zone exclusive of a boundary between the first and second Brillouin zones when propagating through the optical element 111. Besides, the output-side concave mirror 114 and the plurality of output channel waveguides 115 are disposed at positions such that the plurality of light beams having different wavelengths, outgoing from the optical element 111 at different output angles, respectively, are coupled with the predetermined plurality of output channel waveguides 115, respectively.

The arrangement, configuration, etc. of the input channel waveguide 112, the input-side concave mirror 113, the output-side concave mirror 114, the plurality of output channel waveguides 115, and the optical element 111 may be derived from the band diagram of Embodiment 1 described above.

The wavelength separator 110 according to Embodiment 3 has the above-described configuration, which is a waveguide configuration, and hence, can be used in an integrated circuit having optical functions. Further, since the optical element 111, the input-side concave mirror 113, and the output-side concave mirror 114 can be formed by forming the grooves 121, 124a, and 124b in the core 118, the manufacture is facilitated. Still further, since the input channel waveguide 112 and the output channel waveguides 115 can be formed only by forming grooves in the core 118 and filling the grooves with a medium having a higher refractive index than that of the core 118, the manufacture thereof is facilitated.

Figure 19A:
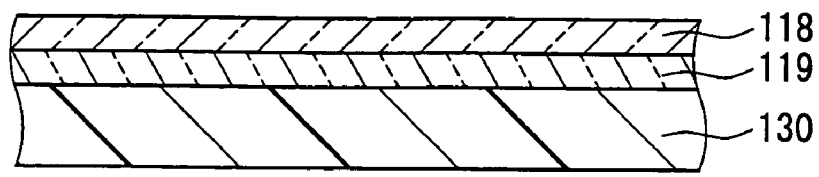
FIG. 19A is a cross-sectional view illustrating a step of a method for producing the wavelength separator according to Embodiment 3 of the present invention.

Next, the following describes a method for producing the wavelength separator 110 according to Embodiment 3. FIGS. 19A to 19D are cross-sectional views illustrating a method for producing the wavelength separator according to Embodiment 3. More specifically, these views are enlarged cross-sectional views of the wavelength separator 110 shown in FIGS. 18A and 18B, which are taken along an X-Y plane set so as to cross the optical element 111, whereby the cross-sectional views show the optical element 111 and the vicinities thereof. A cladding layer 119 is formed on a substrate 130. Further, a core 118 is formed thereon (FIG. 19A). Regarding the film forming method, chemical vapor deposition, physical vapor deposition, and flame deposition are known as methods whereby excellent films with low losses are formed, but the method is not particularly limited.

Figure 19B:
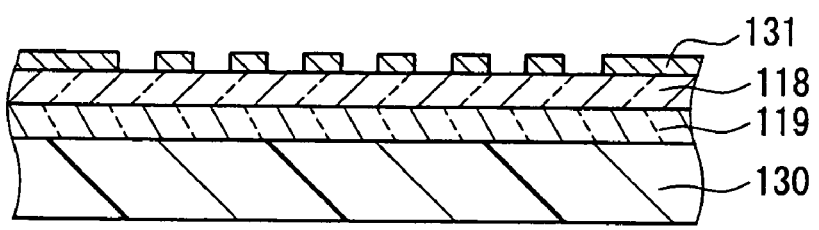
FIG. 19B is a cross-sectional view illustrating a step of the method for producing the wavelength separator according to Embodiment 3 of the present invention.

Next, a metal mask 131 for forming constituent components of the wavelength separator 110 is formed by a so-called lift-off method. First, a surface of the core 118 is coated with a material sensitive to energy such as ultraviolet rays, an electron beam, or X-rays to be projected thereto (hereinafter the material is referred to as resist) by spin coating, and subsequently a resist pattern of desired constituent components is formed by an appropriate exposing method. Next, a metal film is formed on the resist pattern. The film formation can be performed by sputtering, vacuum deposition, or the like, and chromium, tungsten silicide, nickel, or the like can be used as a material of the metal film. In the case where the lift-off method is used, particularly, it is desirable to use vacuum deposition or oriented sputtering with a view to avoiding damages to the photoresist and enhancing the patterning accuracy. By removing unnecessary portions of the metal films along with the resist pattern by the lift-off method, a pattern of the metal mask 131 is formed (FIG. 19B). It should be noted that of course it is possible that the formation of the resist and the formation of the metal film are performed in a reversed order, and the pattern of the metal mask 131 is formed by etching. However, in this case, it is desirable that a material to be etched easily is selected as the metal.

Figure 19C:
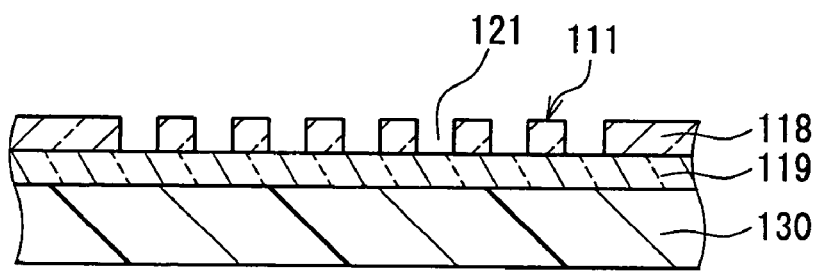
FIG. 19C is a cross-sectional view illustrating a step of the method for producing the wavelength separator according to Embodiment 3 of the present invention.

Subsequently, the optical element 111 is formed by forming grooves in the core 118 with use of an ion etching machine. Though not shown, the input-side concave mirror 113, the output-side concave mirror 114, a groove for the input channel waveguide 112, and grooves for the output channel waveguides 115 also may be produced when the grooves are formed in the core 118 (see FIG. 18B). As the ion etching machine, a machine suitable for a material to be treated preferably is selected. However, in order to treat a large area efficiently, it is desirable to use a reactive ion etching method using high-density plasma, such as inductively coupled plasma (ICP), magnetic neutral loop discharge plasma (NLD), or the like. Remaining portions of the metal mask 131 may be removed with use of a corrosive, by dry etching, etc. (FIG. 19C).

Figure 19D:
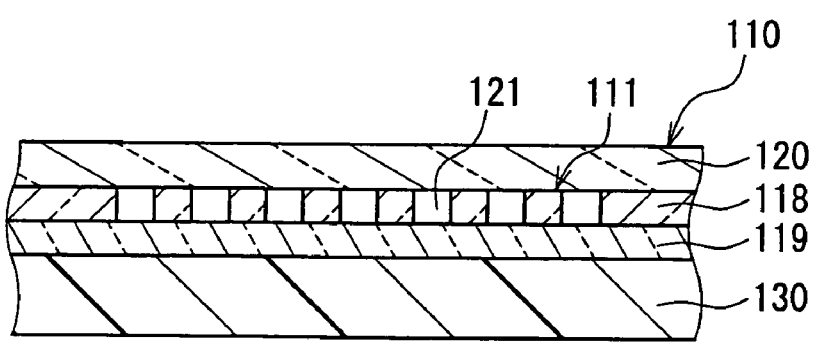
FIG. 19D is a cross-sectional view illustrating a step of the method for producing the wavelength separator according to Embodiment 3 of the present invention.

Finally, the cladding 120 is formed by CVD (FIG. 19D). It should be noted that, though not shown, the grooves may be filled with a material that will constitute cores of the input channel waveguide 112 and the output channel waveguide 115, before the cladding 120 is formed (see FIG. 18B). As described above, the wavelength separator 110 can be produced easily on the substrate 130.

The wavelength separator 110 may be produced by a method other than the foregoing method. The following describes the another method. FIGS. 20A to 20D are cross-sectional views illustrating the another method for producing a wavelength separator according to Embodiment 3 of the present invention. More specifically, these views are enlarged cross-sectional views of the wavelength separator 110 shown in FIGS. 18A and 18B, which are taken along an X-Y plane set so as to cross the optical element 111, whereby the cross-sectional views show the optical element 111 and the vicinities thereof. It should be noted that in FIGS. 20A to 20D, the members having the same functions as those shown in FIGS. 19A to 19D are designated with the same reference numerals, and the descriptions of the same are omitted.

Figure 20A:
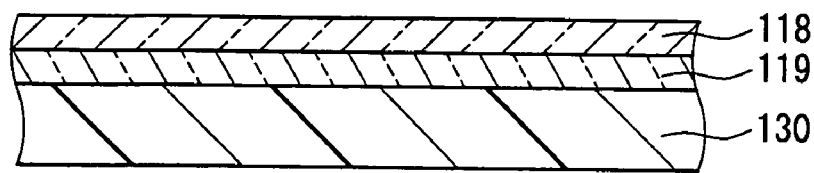
FIG. 20A is a cross-sectional view illustrating a step of another method for producing the wavelength separator according to Embodiment 3 of the present invention.

First, a cladding layer 119 is formed on a substrate 130. Further, a core 118 is formed thereon (FIG. 20A). Regarding the film forming method, chemical vapor deposition, physical vapor deposition, and flame deposition are known as methods whereby excellent films with low losses are formed, but the method is not particularly limited.

Figure 20B:
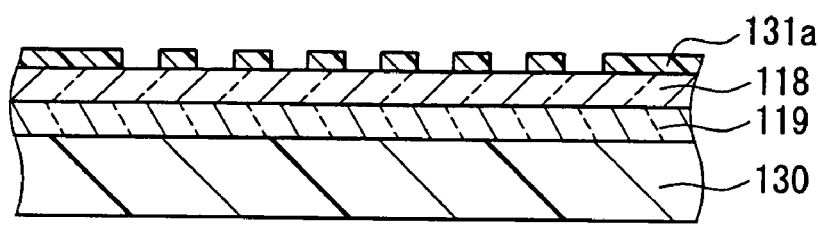
FIG. 20B is a cross-sectional view illustrating a step of the another method for producing the wavelength separator according to Embodiment 3 of the present invention.

Next, a resist 131*a* for forming constituent components of the wavelength separator 110 is formed on the core 118 so as to have a desired pattern. More specifically, first, a surface of the core 118 is coated with a resist 131*a* as a material sensitive to energy such as ultraviolet rays, an electron beam, or X-rays to be projected thereto by spin coating, and a resist pattern of desired constituent components is formed by an appropriate exposing method (FIG. 20B).

Figure 20C:
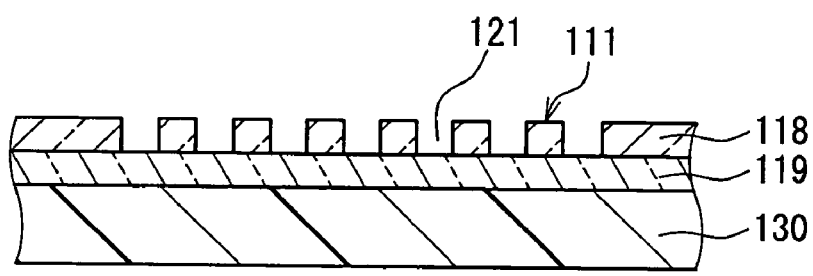
FIG. 20C is a cross-sectional view illustrating a step of the another method for producing the wavelength separator according to Embodiment 3 of the present invention.

Next, using this resist 131*a* as a mask, grooves are formed by etching process, whereby the optical element 111 is formed. Though not shown, the input-side concave mirror 113, the output-side concave mirror 114*a*, a groove for the input channel waveguide 112, and grooves for the output channel waveguides 115 may also be produced when the grooves are formed in the core 118 (see FIG. 18B). Remaining portions of the resist 131*a* may be removed by etching such as oxygen RIE (reactive ion etching) or the like, or by using an organic solvent such as acetone (FIG. 20C).

Figure 20D:
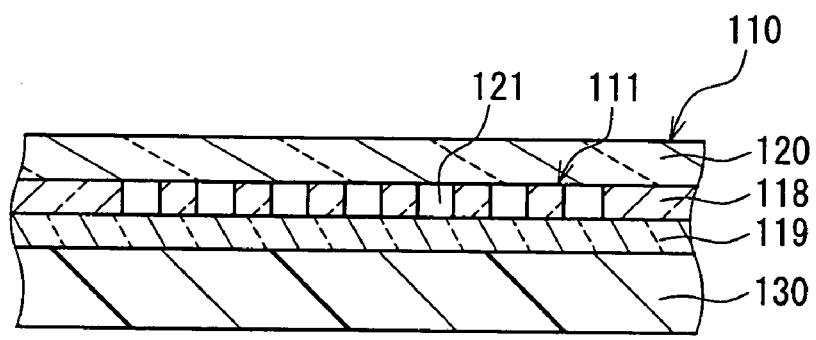
FIG. 20D is a cross-sectional view illustrating a step of the another method for producing the wavelength separator according to Embodiment 3 of the present invention.

Finally, a cladding 120 is formed by CVD (FIG. 20D). It should be noted that, though not shown, the grooves may be filled with a material that will constitute cores of the input channel waveguide 112 and the output channel waveguides 115 before the cladding 120 is formed (see FIG. 18B). As described above, the wavelength separator 110 can be produced easily on the substrate 130. The depth of the grooves 121 thus formed by the foregoing method is smaller as compared with the case where they are formed by the producing method shown in FIGS. 19A to 19D. More specifically, the depth of the grooves 121 is approximately 1 μm. Therefore, depending on a required depth of the grooves 121, either one of the producing method shown in FIGS. 19A to 19D and the producing method shown in FIGS. 20A to 20D may be selected. Thus, the wavelength separators of the embodiments can be produced easily.

The wavelength separator 110 according to Embodiment 3 shown in FIGS. 18A to 18B is configured to have claddings 119 and 120, but it may be configured to include only one of them, or to include neither of them. In such a case, air serves as the cladding. Further, the grooves 124*a*, 124*b*, and 121 for forming the input-side concave mirror 113, the output-side concave mirror 114, and the optical element 111, respectively may be hollow, or filled with a filler material having a refractive index different from that of the core 118.

It should be noted that in the wavelength separator 110, in the case where, for instance, the cladding 119 is made of SiO$_2$ having a refractive index of 1.44 to 1.45, the core 118 is made of Ge—SiO$_2$ having a refractive index of 1.46 to 1.47, and the grooves 121 are hollow, the optical element 111 has a structure in which air and Ge—SiO$_2$ are arranged periodically. In such a wavelength separator, possibly an effective refractive index of the optical element 111 is lower than the refractive index of the cladding 119, and hence, light propagating through the optical element 111 tends to leak to the cladding 119. To cope with this, for instance, the core 118 preferably is made of a material having a relatively high refractive index, such as SiN, Ta$_2$O$_5$, or TiO$_2$. By so doing, the effective refractive index of the optical element 111 is higher as compared with that of the cladding, whereby the leakage of light is reduced. It should be noted that the refractive indices of the foregoing materials are approximately 1.7 to 2.2.

As a method other than increasing the refractive index of the core 118, the effective refractive index of the optical element 111 may be increased by filling the grooves 121 with a filler material having a refractive index higher than that of the core 118. For instance, a material having a relatively high refractive index such as the aforementioned substance, i.e., SiN, Ta$_2$O$_5$, or TiO$_2$, may be filled therein. It should be noted that the filling of the foregoing material in the grooves 121 may be carried out in the state as shown in FIG. 19C by using a method such as the sol-gel process, the liquid-phase process, or the plasma CVD process.

It should be noted that since the effective refractive index of the core 118 varies with the position, the thickness of the core 118 may be optimized at respective positions.

Figure 21A:
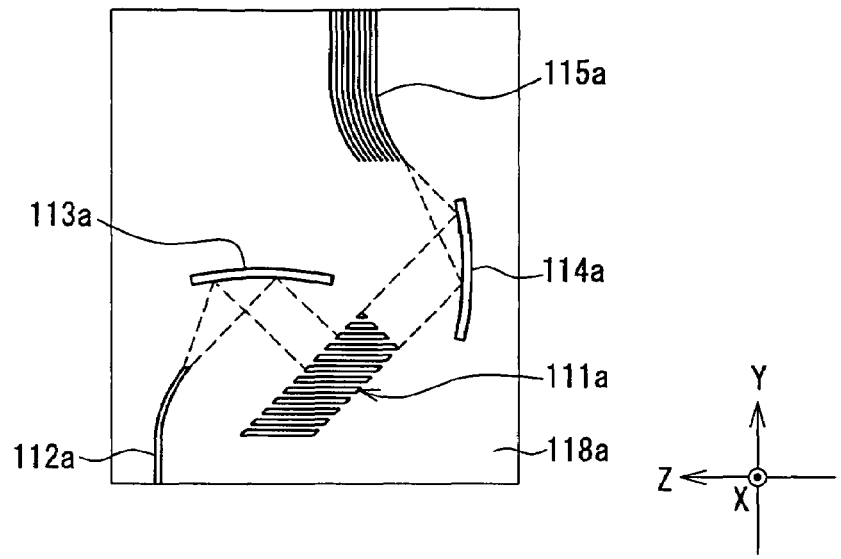
FIG. 21A is a cross-sectional view illustrating another configuration of a wavelength separator according to Embodiment 3 of the present invention.
Figure 21B:
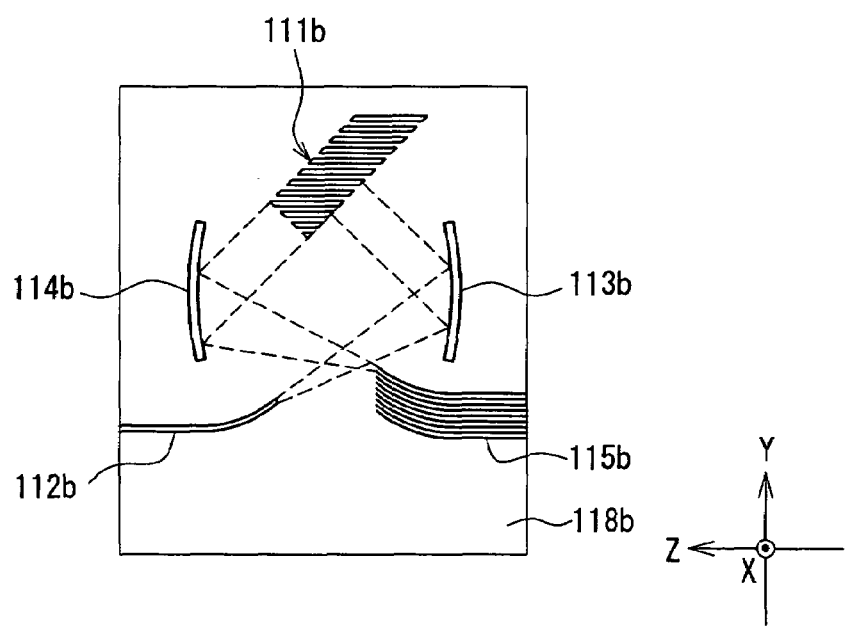
FIG. 21B is a cross-sectional view illustration still another configuration of a wavelength separator according to Embodiment 3 of the present invention.

It is also possible to modify the shape of the wavelength separator 110 by modifying the arrangement of the input channel waveguide 112, the input-side concave mirror 113, the output-side concave mirror 114, the plurality of output channel waveguides 115, and the optical element 111 in the wavelength separator 110 of Embodiment 3 shown above. For instance, FIGS. 21A and 21B are cross-sectional views illustrating other configuration examples of the wavelength separator according to Embodiment 3 of the present invention. FIGS. 21A and 21B illustrate different configuration examples, which both correspond to FIG. 18B. Cores 118*a* and 118*b* in FIGS. 21A and 21B, respectively, correspond to the core 118 of FIG. 18B. Input channel waveguides 112*a* and 112*b* in FIGS. 21A and 21B, respectively, correspond to the input channel waveguide 112 in FIG. 18B. Likewise, input-side concave mirrors 113*a* and 113*b* in FIGS. 21A and 21B, respectively, correspond to the input-side concave mirror 113 in FIG. 18B. Further, output-side concave mirrors 114*a* and 114*b* in FIGS. 21A and 21B, respectively, correspond to the output-side concave mirror 114 in FIG. 18B. Still further, output channel waveguides 115*a* and 115*b* in FIGS. 21A and 21B, respectively, correspond to the output channel waveguides 115 in FIG. 18B. Optical elements 111*a* and 111*b* in FIGS. 21A and 21B, respectively, correspond to the optical element 111 in FIG. 18B. The foregoing members may be arranged in any way as long as the arrangement causes light coupled with a band within the second Brillouin zone exclusive of a boundary between the first and second Brillouin zones to propagate through the optical elements 111*a* and 111*b*.

Figure 22:
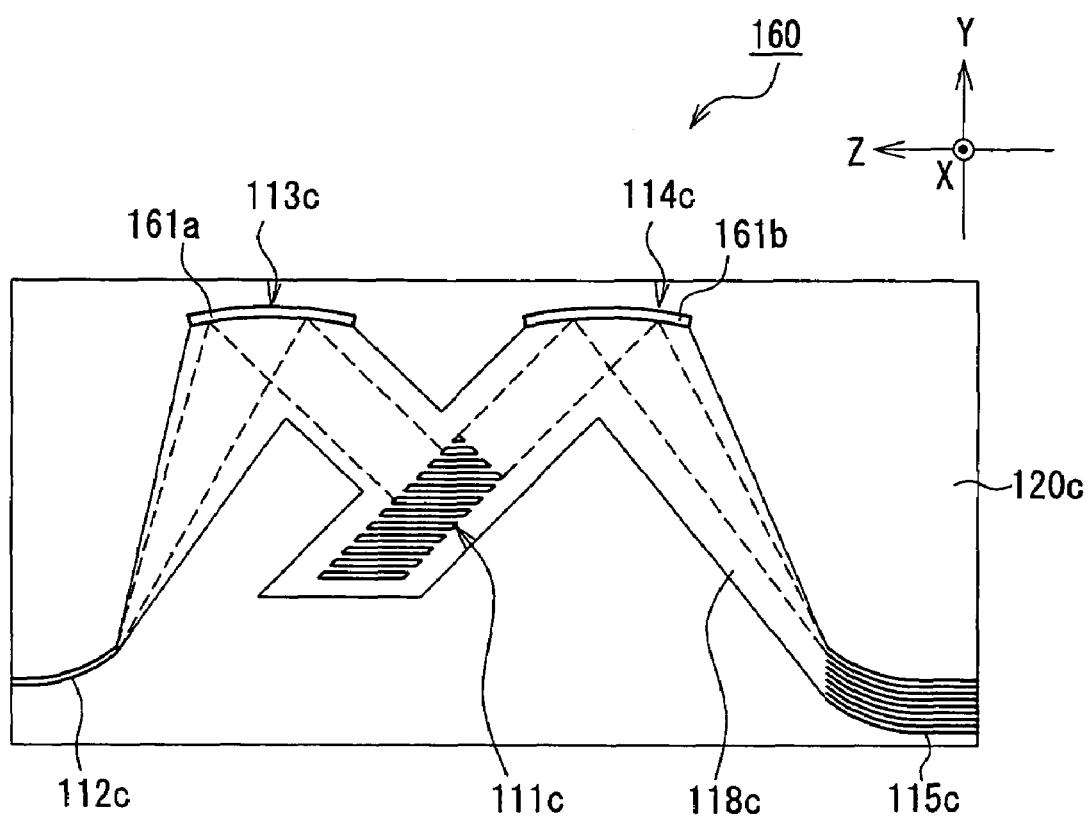
FIG. 22 is a cross-sectional view illustrating still another configuration of a wavelength separator according to Embodiment 3 of the present invention.

Further, the claddings may be formed on side faces of the core. In other words, in FIG. 18A, the core 118 is configured so that light is confined in the X-axis direction by the claddings 119 and 120, but the configuration may be modified so that claddings are formed on side faces in the Y-axis direction and the Z-axis direction of the core, whereby light is confined in the foregoing directions. More specifically, a wavelength separator 160 having a configuration shown in FIG. 22 may be provided. FIG. 22 is a cross-sectional view illustrating still another configuration of the wavelength separator according to Embodiment 3 of the present invention, which corresponds to FIG. 18B. A core 118*c* in FIG. 22 corresponds to the core 118 in FIG. 18B. In FIG. 22, the core 118*c* is formed only in a portion where light propagates, and a cladding 120*c* is formed therearound. This configuration makes it possible to provide the wavelength separator 160 with reduced loss. An input channel waveguide 112*c* in FIG. 22 corresponds to the input channel waveguide 112 in FIG. 18B. Likewise, an input-side concave mirror 113*c* in FIG. 22 corresponds to the input-side concave mirror 113 in FIG. 18B. Further, an output-side concave mirror 114*c* in FIG. 22 corresponds to the output-side concave mirror 114 in FIG. 18B. Still further, output channel waveguides 115*c* in FIG. 22 correspond to the output channel waveguides 115 in FIG. 18B. An optical element 111*c* in FIG. 22 corresponds to the optical element 111 in FIG. 18B.

The foregoing configuration results in a slab waveguide being formed from the input channel waveguide 112*c* to the input-side concave mirror 113c, from the input-side concave mirror 113c to the optical element 111c, from the optical element 111c to the output-side concave mirror 114c, and from the output-side concave mirror 114c to the output channel waveguides 115. In other words, the wavelength separator 160 is composed of the slab waveguide incorporating the optical element 111c, the input-side concave mirror 113c, and the output-side concave mirror 114c, as well as the input channel waveguide 112c and the output channel waveguides 115c. Incident light is guided through the input channel waveguide 112c to the slab waveguide, then, the light diverged in the slab waveguide is converted into an approximately parallel beam (collimated) by the input-side concave mirror 113c, which is incident on the optical element 111c. The light outgoes from the optical element 111c at different angles according to wavelengths, respectively. The light beams having different wavelengths thus obtained are focused by the output-side concave mirror 114c on the output channel waveguides 115c, respectively, from which the light beams outgo, respectively.

The following describes a method for producing the foregoing wavelength separator 160. First, the core 118c is formed on a cladding (not shown), and then, the optical element 111c, the input channel waveguide 112c, and the output channel waveguide 115c are formed in the core 118c through a groove forming process or the like with respect to the core 118c. Further, the cladding 120c is stacked over the entirety, and thereafter, the input-side concave mirror 113c and the output-side concave mirror 114c are formed by forming grooves 161a and 161b by, for instance, etching, whereby the wavelength separator 160 can be produced.

As described above, the wavelength separator of Embodiment 3 has high wavelength resolution, and can be formed in a smaller size. Further, it can be manufactured easily.

EMBODIMENT 4

Figure 23:
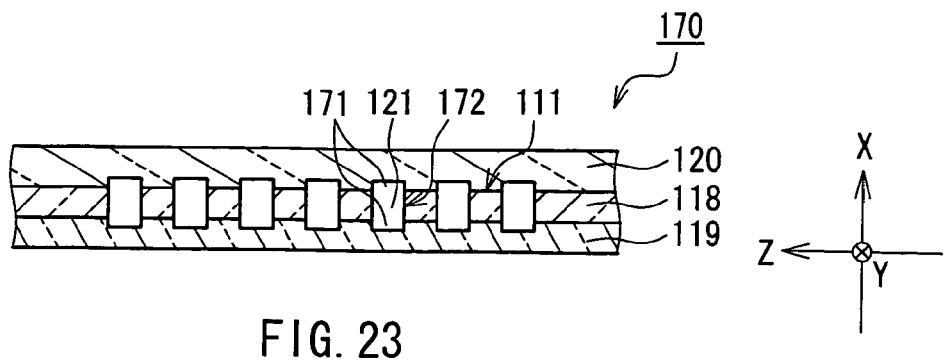
FIG. 23 is a cross-sectional view illustrating a configuration of a wavelength separator according to Embodiment 4 of the present invention.

The following describes a wavelength separator according to Embodiment 4 of the present invention while referring to the drawings. The wavelength separator according to Embodiment 4 has the same fundamental configuration as that of the wavelength separator according to Embodiment 3. The wavelength separator according to Embodiment 4 of the present invention is configured so as to reduce leakage of light from an optical element. FIG. 23 is a cross-sectional view illustrating a configuration of the wavelength separator according to Embodiment 4 of the present invention. It should be noted that in FIG. 23, the members having the same functions as those of the wavelength separator 110 shown in FIG. 19D are designated with the same reference numerals, and their descriptions are omitted. A side view and a cross-sectional view of the wavelength separator 170 of Embodiment 4 are omitted since they are the same as FIGS. 18A and 18B, respectively. FIG. 23 is, more specifically, an enlarged cross-sectional view of the wavelength separator 170, which is taken along a plane perpendicular to the core 118 of the wavelength separator 170 and perpendicular to the direction along the grooves 121 of the optical element 111 (X-Y plane), showing the optical element 111 and the vicinities thereof.

As shown in FIG. 23, the wavelength separator 170 according to Embodiment 4 is configured so that grooves 171 are formed in the claddings 119 and 120, and the grooves 121 formed in the core 118 and the foregoing grooves 171 are connected with each other, whereby grooves 172 obtained by integrating the grooves 121 and 171 are formed. For instance, the core 118 may have a thickness of 3 μm, and the grooves 172 may have a depth of 5 μm. This configuration allows hollows due to the grooves 171 to be provided also in the claddings 119 and 120. This causes the effective refractive indices of the claddings 119 and 120 to decrease. Accordingly, for instance, even in a usual configuration in which $SiO_2$ having a refractive index of 1.44 to 1.45 is used for forming the claddings 119 and 120 and Ge—$SiO_2$ having a refractive index of 1.46 to 1.47 is used for forming the core 118, the effective refractive index of the cladding 120 is lower as compared with the effective refractive index of the core 118 having the grooves 121 that are hollow. Consequently, in the wavelength separator 170, light does not leak from the optical element 111 to the cladding 120.

The following describes a method for producing the foregoing wavelength separator 170. For instance, the core 118 and the cladding 120 are stacked successively on the cladding 119. Here, the cladding 120 is formed with a reduced thickness, by stacking only a part of the cladding 120. In this state, the grooves 121 and 171 are formed in the core 118, the cladding 120 and the cladding 119, the rest of the cladding 120 is stacked over the foregoing already stacked part of the cladding 120. By so doing, the grooves 172 composed of the grooves 121 and 171 are formed in the claddings 119, 120 and the core 118. It should be noted that the optical members other than the optical element 111 may be produced through the above-described producing steps.

The method for forming the wavelength separator 170 is not limited to the method described above. For instance, the wavelength separator 170 may be formed by a method in which the grooves 171 and 121 are formed every time when the cladding 119, the core 118, and the cladding 120 are stacked.

EMBODIMENT 5

Figure 24:
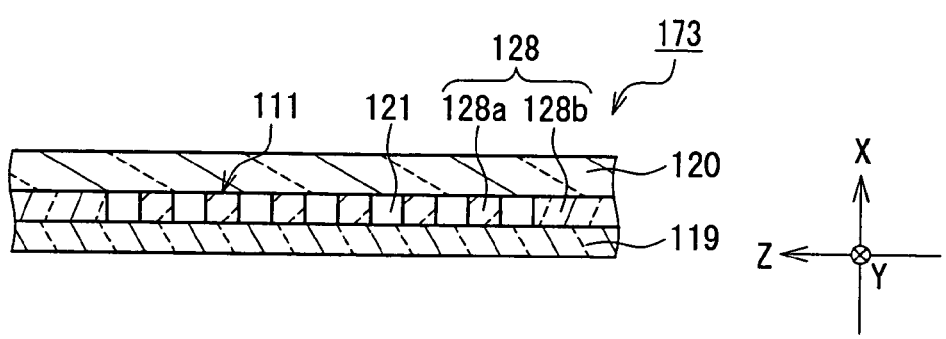
FIG. 24 is a cross-sectional view illustrating a configuration of a wavelength separator according to Embodiment 5 of the present invention.

The following describes a wavelength separator according to Embodiment 5 of the present invention while referring to the drawings. The wavelength separator according to Embodiment 5 has the same fundamental configuration as that of the wavelength separator according to Embodiment 3. The wavelength separator according to Embodiment 5 is configured so as to further reduce leakage of light from an optical element. FIG. 24 is a cross-sectional view illustrating a configuration of the wavelength separator according to Embodiment 5 of the present invention. It should be noted that the difference of the wavelength separator 173 shown in FIG. 24 from the wavelength separator 110 shown in FIG. 19D is that a core 128 includes two types of homogeneous media, i.e., a core 128a and a core 128b. Here, the core 128a is disposed at a position where the optical element 111 is formed, while the core 128b is disposed at a position other than the position where the core 128a is disposed. The wavelength separator 173 of FIG. 24 and the wavelength separator 110 of FIG. 19D have substantially the same configuration except for the foregoing difference. Therefore, in FIG. 24, the members having the same functions as those of the wavelength separator 110 shown in FIG. 19D are designated with the same reference numerals, and their descriptions are omitted. A side view and a cross-sectional view of the wavelength separator 173 of Embodiment 5 are omitted since they are the same as FIGS. 18A and 18B, respectively. FIG. 24 is, more specifically, an enlarged cross-sectional view of the wavelength separator 173, which is taken along a plane perpendicular to the cores 128a, and 128b of the wavelength separator 173 and perpendicular to the direction along the grooves 121 of the optical element 111 (X-Y plane), showing the optical element 111 and the vicinities thereof.

The wavelength separator 173 includes the core 128 composed of two types of homogeneous media, that is, the core 128a and 128b. The core 128a is disposed at a position where the optical element 111 is formed. The core 128b is disposed at a position other than the position where the optical element 111 is formed, and at least in contact with the incident end face and the output end face of the optical element 111. Further, the refractive index of the core 128a is higher than the refractive index of the core 128b.

The optical element 111 is configured so that the core 128a and air filled in the grooves 121 are arranged alternately. Therefore, it appears that, as compared with the core 128b formed with a homogeneous medium alone, light would tend to leak therefrom to the claddings 119 and 120 more easily. However in the wavelength separator 173, since the refractive index of the core 128a is higher than the refractive index of the core 128b, light leakage from the optical element 111 to the claddings 119 and 120 is reduced, even with the configuration in which the grooves 121 are formed in the core 128a. Further, the refractive index of the core 128b for the optical members other than the optical element 111, for instance, the input channel waveguide 112, the input-side concave mirror 113, the output-side concave mirror 114, and the output channel waveguide 115 (see FIG. 18B) is not excessively high. Therefore, favorable propagation properties can be obtained.

It should be noted that since, the effective refractive index of the core 128 varies with the position, the thickness of the core 128 may be optimized at respective positions.

EMBODIMENT 6

Figure 25:
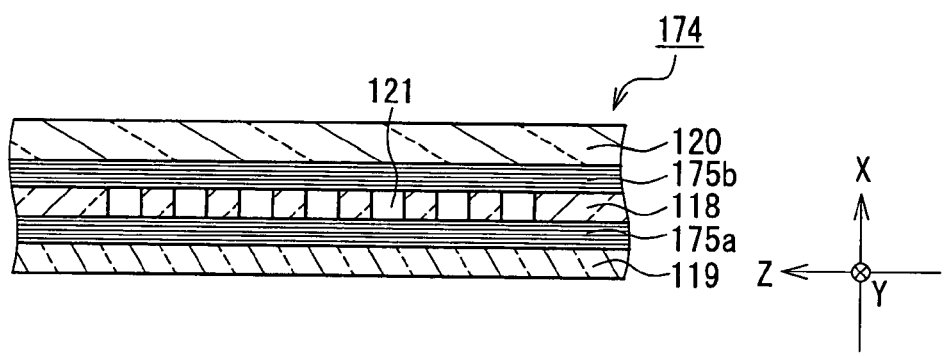
FIG. 25 is a cross-sectional view illustrating a configuration of a wavelength separator according to Embodiment 6 of the present invention.

The following describes a wavelength separator according to Embodiment 6 of the present invention while referring to the drawings. The wavelength separator according to Embodiment 6 has the same fundamental configuration as that of the wavelength separator according to Embodiment 3. The wavelength separator according to Embodiment 6 is configured so as to further reduce leakage of light from an optical element. FIG. 25 is a cross-sectional view illustrating a configuration of the wavelength separator according to Embodiment 6 of the present invention. It should be noted that the difference of the wavelength separator 174 shown in FIG. 25 from the wavelength separator shown in FIG. 19D is that multilayered films 175a and 175b are formed between the core 118 and the cladding 119 and between the core 118 and the cladding 120, respectively. Here, the lamination direction of the multilayered films 175a and 175b is perpendicular to the core 118. The wavelength separator 174 of FIG. 25 and the wavelength separator 110 of FIG. 19D have substantially the same configuration except for the foregoing difference. Therefore, in FIG. 25, the members having the same functions as those of the wavelength separator 110 shown in FIG. 19D are designated with the same reference numerals, and their descriptions are omitted. A side view and a cross-sectional view of the wavelength separator 174 of Embodiment 6 are omitted since they are the same as FIGS. 18A and 18B. FIG. 25 is, more specifically, an enlarged cross-sectional view of the wavelength separator 174, which is taken along a plane perpendicular to the core 118 of the wavelength separator 174 and perpendicular to the direction along the grooves 121 of the optical element 111 (X-Y plane), showing the optical element 111 and the vicinities thereof.

The multilayered films 175a and 175b have refractive index periodicities, respectively, in the lamination direction (X-axis direction), and in other words, they are so-called one-dimensional photonic crystals. The multilayered films 175a and 175b having such a configuration are able to cause a band gap to occur in the foregoing direction of the refractive index periodicities. This makes it possible to provide a configuration with which light leakage from the optical element 111 to the claddings 119 and 120 is avoided.

The following describes a method for producing the foregoing wavelength separator 174. For instance, the multilayered film 175a and the core 118 are formed successively on the cladding 119, and the grooves 121 are formed in the core 118. Thereafter, the multilayered film 175b and the cladding 120 may be formed successively. Alternatively, the multilayered films 175a and 175b may be caused to adhere to the core 118 on which the grooves 121 are formed. For the adhesion, for instance, boric acid may be used. The optical members other than the optical element 111 may be produced through the above-described producing steps. It should be noted that the method for producing the wavelength separator 174 is not limited to the foregoing producing method.

Figure 26:
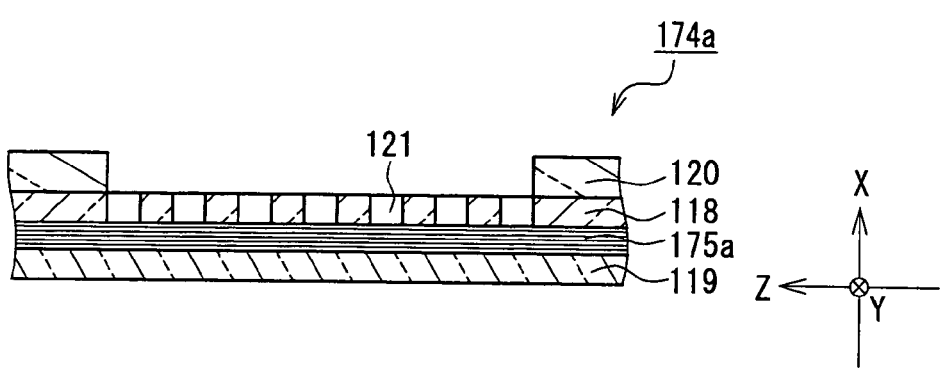
FIG. 26 is a cross-sectional view illustrating a configuration of another wavelength separator according to Embodiment 6 of the present invention.

FIG. 26 is a cross-sectional view illustrating a configuration of another wavelength separator according to Embodiment 6 of the present invention. As shown in FIG. 26, in a wavelength separator 174a, a multilayered film 175a is formed between one of the claddings, i.e., the cladding 119, and the core 118, whereas no multilayered film is formed between the other cladding, i.e., the cladding 120, and the core 118. Besides, the cladding 120 is not formed at a position at which it would be in contact with the optical element 111, whereby on one of the sides of the optical element 111, air serves as cladding. Regarding the optical element 111 of the wavelength separator 174a having the foregoing configuration, sides thereof in the direction perpendicular to the light propagation direction are in contact with the multilayered film 175a and air, respectively. Both of these are materials that reduce the light leakage from the optical element 111. Therefore, the wavelength separator 174a has low propagation loss.

The aforementioned wavelength separators 170, 173, 174, and 174a according to Embodiments 4 to 6 may be configured so that light that could be coupled with a photonic band within the second Brillouin zone exclusive of a boundary between the first and second Brillouin zones is incident on the optical element 111. This configuration allows these wavelength separators 171, 173, 174, and 174a to have high wavelength resolution and to be formed in a reduced size, like the wavelength separator of Embodiment 3. Further, these wavelength separators 170, 173, 174, and 174a can be manufactured easily.

It should be noted that Embodiments 1 to 6 described above are mere examples of the present invention, and the present invention should not be interpreted limitedly according to the embodiments. The scope of the invention is indicated by the appended claims rather than by the foregoing descriptions of the embodiments, and all changes which come within the meaning and range of equivalency of the claims are intended to be embraced therein.

The field of use of the optical element and the wavelength separator using the same of the present invention is not limited particularly, but they are of effective use in photonic integrated circuits and the like since they are in small sizes and have high wavelength resolution.

What is claimed is:

1. An optical element comprising a one-dimensional photonic crystal structure formed by providing a plurality of grooves in parallel with one another at uniform intervals in a surface of a homogeneous medium, the optical element having an incident end face formed obliquely with respect to a direction in which the grooves extend, and an output end face approximately perpendicular to the incident end face, wherein the incident end face being formed at first ends of the plurality of grooves while the output end face being formed at second ends of at least some of the plurality of grooves, wherein a normal to the incident end face and a normal to the output end face define a plane that is substantially parallel to a plane of the surface containing the plurality of grooves.

2. The optical element according to claim 1, wherein the grooves are filled with a filler material having a refractive index different from a refractive index of the homogeneous medium.

3. A wavelength separator comprising:
the optical element according to claim 1;
a light input section causing a light beam to be incident on the incident end face of the optical element; and
a light output section on which light beams outgoing from the output end face of the optical element are incident, the light beams outgoing at different output angles depending on wavelengths thereof, respectively,
element in a manner such that the light beam is coupled with a photonic band within the second Brillouin zone exclusive of a boundary between the first and second Brillouin zones.

4. The wavelength separator according to claim 3, wherein the light input section causes the light beam incident on the incident end face from the light input section to enter the optical element though the incident end face at an incident angle such that the light beam is coupled with the photonic band within the second Brillouin zone exclusive of a boundary between the first and second Brillouin zones.

5. The wavelength separator according to claim 3, wherein
the light input section comprises:
an input-side optical waveguide part through which incident light propagates; and
a collimating section for converting the incident light having propagated through the input-side optical waveguide part into an approximately parallel light beam and causing the approximately parallel light beam to be incident on the optical element, and
the light output section comprises:
a plurality of output-side optical waveguide pans on which a plurality of outgoing light beams outgoing from the optical element are incident, respectively, the outgoing light beams outgoing at different output angles depending on wavelengths, respectively; and
a focusing part for focusing the plurality of outgoing light beams so that the plurality of outgoing light beans are incident on the plurality of output-side optical waveguide parts, respectively.

6. The wavelength separator according to claim 5, further comprising two claddings disposed so that the homogeneous medium is provided between the claddings so as to be a core of the claddings, wherein
the input-side optical waveguide part is an input-side optical waveguide provided in the homogeneous medium,
the collimating part is an input-side concave mirror provided in the homogeneous medium,
the focusing part is an output-side concave mirror provided in the homogeneous medium, and
the output-side optical waveguide part is an output-side optical waveguide provided in the homogeneous medium.

7. The wavelength separator according to claim 6, wherein the input-side optical waveguide and the output-side optical waveguide are formed by providing additional grooves in the homogeneous medium, and filling the additional grooves with a filler material having a refractive index higher than a refractive index of the homogeneous medium.

8. The wavelength separator according to claim 6, wherein the input-side concave mirror and the output-side concave mirror are formed by forming curved grooves in the homogeneous medium, the input-side concave mirror and the output-side concave mirror being formed at interfaces between the homogeneous medium and the curved grooves.

9. The wavelength separator according to claim 3, further comprising two claddings disposed so that the homogeneous medium is provided between the claddings so as to be a core of the claddings, wherein the light input section and the light output section are formed in the homogeneous medium.

10. The wavelength separator according to claim 9, wherein a plurality of grooves are formed in the cladding, the plurality of grooves being connected with the plurality of parallel grooves provided in the homogeneous medium, respectively.

11. The wavelength separator according to claim 9, wherein the grooves are filled with a filler material having a refractive index different from a refractive index of the homogeneous medium.

12. The wavelength separator according to claim 9, wherein multilayered films are formed between one of the two claddings and the homogeneous medium and between the other cladding and the homogeneous medium, respectively, the multilayered films having a refractive index periodicity in a direction perpendicular to the homogeneous medium.

13. The wavelength separator according to claim 9, wherein
a multilayered film is formed between one of the two claddings and the homogeneous medium, the multilayered film having a refractive index periodicity in a direction perpendicular to the homogeneous medium, and
the other one of the two claddings is not in contact with the optical element.

14. The wavelength separator according to claim 3, further comprising:
a waveguide-use homogeneous medium having a refractive index lower than a refractive index of the homogeneous medium, the waveguide-use homogeneous medium being disposed at least in contact with the incident end face and the output end face; and
two claddings disposed so that the homogeneous medium and the waveguide-use homogeneous medium are provided between the claddings so as to be a core of the claddings,
wherein the light input section and the light output section are formed in the waveguide-use homogeneous medium.

* * * * *